United States Patent
Honda et al.

(10) Patent No.: US 9,133,925 B2
(45) Date of Patent: Sep. 15, 2015

(54) POWER PLANT

(71) Applicant: HONDA MOTOR CO., LTD., Tokyo (JP)

(72) Inventors: Kenji Honda, Wako (JP); Yasuji Shibahata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/386,966

(22) PCT Filed: Mar. 19, 2013

(86) PCT No.: PCT/JP2013/057818
§ 371 (c)(1),
(2) Date: Sep. 22, 2014

(87) PCT Pub. No.: WO2013/146467
PCT Pub. Date: Oct. 3, 2013

(65) Prior Publication Data
US 2015/0065282 A1    Mar. 5, 2015

(30) Foreign Application Priority Data

Mar. 27, 2012  (JP) .................. 2012-070991
Aug. 1, 2012  (JP) .................. 2012-170972

(51) Int. Cl.
| | |
|---|---|
| *F16H 3/72* | (2006.01) |
| *F16H 48/06* | (2006.01) |
| *B60K 6/365* | (2007.10) |
| *B60K 6/445* | (2007.10) |
| *F16H 48/36* | (2012.01) |
| *B60K 1/02* | (2006.01) |

(52) U.S. Cl.
CPC  *F16H 48/06* (2013.01); *B60K 1/02* (2013.01); *B60K 6/365* (2013.01); *B60K 6/445* (2013.01); *F16H 48/36* (2013.01); *F16H 2048/364* (2013.01); *Y02T 10/6239* (2013.01)

(58) Field of Classification Search
None
See application file for complete search history.

(56) References Cited

U.S. PATENT DOCUMENTS

| | | | |
|---|---|---|---|
| 8,012,057 B2 * | 9/2011 | Meixner | 475/6 |
| 8,430,779 B2 * | 4/2013 | Hoehn | 475/225 |
| 2010/0206127 A1 * | 8/2010 | Wheals | 74/665 T |

FOREIGN PATENT DOCUMENTS

| | | |
|---|---|---|
| JP | 05-116542 A | 5/1993 |
| JP | 2006-304420 A | 11/2006 |
| JP | 2008-215519 A | 9/2008 |
| JP | 2011-237019 A | 11/2011 |

OTHER PUBLICATIONS

International Search Report dated May 21, 2013 corresponding to International Application No. PCT/JP2013/057818 and English translation thereof.

* cited by examiner

*Primary Examiner* — Dirk Wright
(74) *Attorney, Agent, or Firm* — Squire Patton Boggs (US) LLP

(57) ABSTRACT

A power plant capable of achieving downsizing thereof. The power plant 1 is comprised of a double pinion gear 14 formed by first and second pinion gears P1 and P2 integrally formed with each other, a pinion gear P in mesh with the first pinion gear P1, a rotatable carrier member 13 rotatably supporting the double pinion gear 14 and the pinion gear P, a rotatable sun gear S in mesh with the pinion gear P, a rotatable first ring gear R1 in mesh with the first pinion gear P1 and connected to one SRR of the two rotating shafts, a rotatable second ring gear R2 in mesh with the second pinion gear P2 and connected to the other SRL of the two rotating shafts, a first energy input/output device 11 connected to the carrier member 13 and capable of inputting and outputting rotational energy, and a second energy input/output device 12 connected to the sun gear S and capable of inputting and outputting rotational energy.

14 Claims, 20 Drawing Sheets

POWER PLANT

FIELD OF THE INVENTION

This invention relates to a power plant for driving two rotating shafts which are differentially rotatable with each other.

BACKGROUND ART

Conventionally, as a power plant of this kind, there has been known one disclosed e.g. in Patent Literature 1. This conventional power plant is used for driving left and right output shafts of a vehicle, and is comprised of a first rotating electric machine and a second rotating electric machine as motive power sources, double pinion gears each integrally including a first pinion gear and a second pinion gear, a carrier rotatably supporting the double pinion gears, a first sun gear in mesh with the first pinion gears, a second sun gear in mesh with the second pinion gears, and a ring gear. The ring gear, carrier, first and second sun gears are in a collinear relationship in which the rotational speeds thereof are located on the same straight line in a collinear chart and are arranged from the left side in this order.

Further, in this conventional power plant, in order to transmit the torque difference between the first and second rotating electric machines to left and right drive wheels in an increased state, a connection relationship between the four rotary elements consisting of the ring gear, the carrier, and the first and second sun gears, the left and right output shafts, and the first and second rotating electric machines is set as follows: Out of the four rotary elements, two rotary elements positioned at respective outer locations in the collinear chart, that is, the ring gear and the second sun gear are connected to the first and second rotating electric machines, respectively. Further, two rotary elements positioned at inner locations in the collinear chart, that is, the carrier member and the first sun gear are connected to the left and right output shafts, respectively.

CITATION LIST

Patent Literature 1

[PTL 1] Japanese Laid-Open Patent Publication No. 2011-237019

SUMMARY OF INVENTION

Technical Problem

As described above, in the conventional power plant, an object thereof is to transmit the torque difference between the first and second rotating electric machines to the left and right drive wheels in an increased state, and to attain the object, it is absolutely required to connect the first sun gear to the right output shaft. Therefore, relatively large torque is transmitted to the first sun gear in order to drive the right output shaft. On the other hand, as shown in FIG. 19, a meshing radius rs of the first sun gear is relatively small, and torque transmitted from the first sun gear to the right output shaft is represented by the product of the meshing radius rs and engagement reaction force fs in the tangential direction acting on the first sun gear, and hence in accordance with transmission of large torque to the right output shaft, a very large engagement reaction force fs acts on the first sun gear. For this reason, to withstand such engagement reaction force fs, it is required to set the tooth width of the first sun gear to a large value, which increases the size of the power plant.

Further, as shown in FIG. 19, a centrifugal force gp acts on bearings supporting the first pinion gears of the double pinion gears (hereinafter referred to the "pinion bearings") along with rotation of the first pinion gears. Further, in accordance with transmission of large torque from the first sun gear to the right output shaft, a relatively large engagement reaction force ps in the direction of normal acts on the first pinion gears from the first sun gear. This engagement reaction force ps acts on the pinion bearings in the same direction as the direction of the above-mentioned centrifugal force. Note that in FIG. 19, only the centrifugal force gp and the engagement reaction force ps are illustrated which act on a pinion bearing supporting a first pinion gear located at the lower right of the figure, for convenience. As described above, a very large resultant force obtained by adding the centrifugal force gp caused by rotation of the first pinion gear and the large engagement reaction force ps from the first sun gear acts on the pinion bearing, and hence to ensure sufficient durability of the pinion bearing, it is inevitable to increase the size of the pinion bearing, which also causes an increase in the size of the power plant.

The present invention has been made to provide a solution to the above-described problems, and an object thereof is to provide a power plant which is capable of achieving downsizing thereof.

Solution to Problem

To attain the above object, the invention according to claim 1 is a power plant 1, 41 for driving two rotating shafts (left and right output shafts SRI, SRR, SFL, SFR in embodiments the same applies hereinafter in this section) which are differentially rotatable with each other, comprising a double pinion gear 14 that is formed by a first pinion gear P1 and a second pinion gear P2 which are integrally formed with each other, a pinion gear P that is in mesh with the first pinion gear P1, a carrier member 13 that is rotatable, the carrier member 13 rotatably supporting the double pinion gear 14 and the pinion gear P, a sun gear S that is rotatable and is in mesh with the pinion gear P, a first ring gear R1 that is rotatable and is in mesh with the first pinion gear P1, the first ring R1 gear being connected to one (right output shaft SRR, SFR) of the two rotating shafts, a second ring gear R2 that is rotatable and is in mesh with the second pinion gear P2, the second ring gear R2 being connected to the other (left output shaft SRL, SFL) of the two rotating shafts, a first energy input/output device (first rotating electric machine 11) that is connected to the carrier member 13 and is capable of inputting and outputting rotational energy, and a second energy input/output device (second rotating electric machine 12) that is connected to the sun gear S and is capable of inputting and outputting rotational energy.

With this arrangement, the double pinion gear and the pinion gear is rotatably supported by the carrier member, and the first pinion gear of the double pinion gear is in mesh with the pinion gear. Further, the pinion gear is in mesh with the sun gear, and the first and second pinion gears of the double pinion gear are in mesh with the first and second ring gears, respectively. From the above, the rotational speeds of the sun gear, the first ring gear, the second ring gear, and the carrier member are in a so-called collinear relationship, and are located on the same straight line in a collinear chart. Further, in this collinear chart, the carrier member and the sun gear are located on opposite outer sides, respectively, and the first and second ring gears are positioned inside.

Further, the carrier member and the sun gear are connected to the first and second energy input/output devices, respectively, and the first and second ring gears are connected to one of the two rotating shafts (hereinafter referred to as the "one rotating shaft") and the other thereof (hereinafter referred to as the "other rotating shaft"), respectively. With the above, it is possible to transmit rotational energy output from the first and second energy input/output devices to the two rotating shafts via the carrier member, the sun gear, the first and second ring gears, and so forth, and properly drive the two rotating shafts. In this case, as described above, the rotational speeds of the carrier member, the sun gear, and the first and second ring gears are in the collinear relationship with each other, so that by controlling input and output of rotational energy to and from the first and second energy input/output devices, it is possible to properly control rotational energy (torque) distributed to the two rotating shafts.

Furthermore, differently from the above-describe conventional power plant, not the sun gear but the first and second ring gears are connected to the one and the other of the rotating shafts, respectively. As shown in FIG. 20, since a meshing radius rr of the first ring gear is relatively large, and torque transmitted from the first ring gear to the one rotating shaft is represented by the product of the meshing radius rr and an engagement reaction force FR acting on the first ring gear, the engagement reaction force FR acting on the first ring gear in accordance with the transmission of the torque to the one rotating shaft becomes smaller than the case of the above-describe conventional first sun gear. The same applies to the second ring gear since the meshing radius thereof is relatively large. Therefore, it is possible to set the tooth widths of the first and second ring gears to relatively small values, whereby it is possible to downsize the power plant.

Further, as described above, as is apparent from the fact that in the collinear chart, the carrier member and the sun gear are located outside the first and second ring gears, respectively, respective torques transmitted from the first and second energy input/output devices to the carrier member and the sun gear are transmitted to the two rotating shafts in increased states. This makes it possible to downsize the carrier member and set the tooth width of the sun gear to a relatively small value, which also makes it possible to downsize the power plant.

Furthermore, as shown in FIG. 20, a centrifugal force GP acts on a bearing which supports the first pinion gear (hereinafter referred to as the "first pinion bearing") along with rotation of the first pinion gear. Further, an engagement reaction force PR from the first ring gear acts on the first pinion gear in accordance with transmission of torque from the first ring gear to the one rotating shaft. This engagement reaction force PR acts on the first pinion bearing in a direction opposite to the direction of the above-mentioned centrifugal force GP. As a consequence, since the centrifugal force GP and the engagement reaction force PR act on the first pinion bearing such that they are offset by each other, it is possible to downsize the first pinion bearing in comparison with the above-described conventional pinion bearing. Note that in FIG. 20, only the centrifugal force GP and the engagement reaction force PR are illustrated which act on a first pinion bearing supporting a first pinion gear located on the right side, as viewed in the figure, for convenience.

The same applies to a bearing which supports the second pinion gear (hereinafter referred to as the "second pinion bearing"). More specifically, a centrifugal force acts on the second pinion bearing in accordance with rotation of the second pinion gear. Further, engagement reaction force from the second ring gear acts on the second pinion gear in accordance with transmission of torque from the second ring gear to the other rotating shaft. Since the centrifugal force and the engagement reaction force act on the second pinion bearing such that they are offset by each other, it is possible to downsize the second pinion bearing. Also by downsizing the first and second pinion bearings as described above, it is possible to downsize the power plant.

Note that although FIG. 20 illustrates an example in which three first pinion gears and three pinion gears are provided, it is to be understood that this is not limitative.

The invention according to claim 2 is the power plant 41 according to claim 1, further comprising a differential gear D that includes a first rotary element (sun gear SD), a second rotary element (carrier CD), and a third rotary element (ring gear AD), which are differentially rotatable with each other, and an energy output device (engine 3) that is configured to be capable of outputting rotational energy, and is provided separately from the first and second energy input/output devices, wherein the first rotary element is connected to a rotational energy transmission path (flange 17) between the first ring gear A1 and the one (right output shaft SFR) of the two rotating shafts, the second rotary element is provided in a rotational energy transmission path between the second ring gear R2 and the other (left output shaft SFL) of the two rotating shafts, and the third rotary element is connected to the energy output device.

With this arrangement, the first to third rotary elements of the differential gear are configured to be differentially rotatable with each other. Further, the first rotary element is connected to the rotational energy transmission path between the first ring gear and the one of the two rotating shafts, the second rotary element is provided in the rotational energy transmission path between the second ring gear and the other of the two rotating shafts, and the third rotary element is connected to the energy output device. Further, this energy output device is provided separately from the first and second energy input/output devices. With the above, not only the rotational energy from the first and second energy input/output devices but also the rotational energy from the energy output device is transmitted to the two output shafts, and hence it is possible to reduce rotational energy required of the first and second energy input/output devices. This makes it possible to downsize both of the energy input/output devices.

To attain the above object, the invention according to claim 3 is a power plant 51, 61 for driving two rotating shafts (left and right output shafts SRL, SRR in embodiments (the same applies hereinafter in this section)) which are differentially rotatable with each other, comprising a double pinion gear 102 that is formed by a first pinion gear P1A and a second pinion gear P2A which are integrally formed with each other, a pinion gear PA that is in mesh with the first pinion gear P1A, a carrier member 101 that is rotatable, the carrier member 101 rotatably supporting the double pinion gear 102 and the pinion gear PA and being connected to one (right output shaft SRR) of the two rotating shafts, a first sun gear S1A that is rotatable and is in mesh with the pinion gear PA, a second sun gear S2A that is rotatable and is in mesh with the second pinion gear P2A, a first ring gear R1A that is rotatable and is in mesh with one of the first and second pinion gears P1A, P2A, the first ring bear R1A being connected to the other (left output shaft SRL) of the two rotating shafts, a first energy input/output device (first rotating electric machine 11) that is connected to the first sun gear S1A and is capable of inputting and outputting rotational energy, and a second energy input/output device (second rotating electric machine 12) that is connected to the second sun gear S2A and is capable of inputting and outputting rotational energy.

With this arrangement, the double pinion gear and the pinion gear are rotatably supported by the carrier member. The first pinion gear of the double pinion gear is in mesh with the pinion gear, the pinion gear is in mesh with the first sun gear, and the second pinion gear is in mesh with the second sun gear. Further, the first ring gear that is in mesh with the first and second pinion gears of the double pinion gear is provided. From the above, the rotational speeds of the first sun gear, the first ring gear, the carrier member, and the second sun gear are in a so-called collinear relationship, and are located on the same straight line in a collinear chart in this order. The first and second sun gears are located outside the first ring gear and the carrier member, respectively.

Further, the first and second sun gears are connected to the first and second energy input/output devices, respectively, and the carrier member and the first ring gear are connected to one rotating shaft (one of the two rotating shafts) and the other rotating shaft (the other of the two rotating shafts), respectively. With the above, it is possible to transmit rotational energy output from the first and second energy input/output devices to the two rotating shafts via the first sun gear, the second sun gear, the first ring gear, the carrier member, and so forth, and properly drive both the rotating shafts. In this case, as described heretofore, the rotational speeds of the first sun gear, the first ring gear, the carrier member, and the second sun gear are in the collinear relationship with each other, so that by controlling input and output of rotational energy to and from the first and second energy input/output devices, it is possible to properly control rotational energy (torque) distributed to the two rotating shafts.

Furthermore, differently from the above-described conventional power plant, not the sun gear but the first ring gear is connected to the other rotating shaft. As is apparent from the description of claim 1, the engagement reaction force acting on the first ring gear in accordance with transmission of torque to the other rotating shaft becomes smaller than the case of the above-describe conventional first sun gear. Therefore, it is possible to set the tooth width of the first ring gear to a relatively small value, whereby it is possible to downsize the power plant.

Further, as described hereinabove, as is apparent from the fact that in the collinear chart, the first and second sun gears are located outside the first ring gear and the carrier member, respectively, respective torques transmitted from the first and second energy input/output devices to the first and second sun gears are transmitted to the two rotating shafts in increased states. This makes it possible to set the tooth widths of the first and second sun gears to relatively small values, which also makes it possible to downsize the power plant.

Furthermore, one of the first and second pinion gears is in mesh with the first ring gear, so that similarly to the invention according to claim 1, the centrifugal force caused by rotation of the one of the first and second pinion gears and the engagement reaction force act such that they are offset by each other, so that compared with the above-described conventional pinion bearing, it is possible to downsize the bearing supporting one of the first and second pinion gears, which also makes it possible to downsize the power plant.

The invention according to claim 4 is the power plant 61 according to claim 3, further comprising a second ring gear R2A that is rotatable and is in mesh with the other of the first and second pinion gears P1A, P2A.

With this arrangement, the power plant further includes the second ring gear that is in mesh with the first and second pinion gears. As is apparent from the arrangement described in claim 3, the rotational speeds of the first sun gear, one of the first and second ring gears, the other of the first and second ring gears, the carrier member, and the second sun gear are in a so-called collinear relationship, and are located on the same straight line in a collinear chart. As described above, it is possible to form five rotary elements the rotational speeds of which are in a collinear relationship with each other.

Further, similarly to the case of claim 1, the centrifugal force caused by rotation of the first and second pinion gears and the engagement reaction force act such that they are offset by each other, and hence compared with the above-described conventional pinion bearing, it is possible to downsize the bearings supporting the first and second pinion gears, which also makes it possible to downsize the power plant.

The invention according to claim 5 is the power plant 61 according to claim 4, further comprising an energy output device that is configured to be capable of outputting rotational energy, and is provided separately from the first and second energy input/output devices, wherein the second ring gear R2A is mechanically connected to the energy output device.

With this arrangement, out of the five rotary elements, i.e. the first sun gear, one of the first and second ring gears, the other of the first and second ring gears, the carrier member, and the second sun gear, described in the description of claim 4, the rotational speeds of which are in the collinear relationship with each other, the first ring gear is mechanically connected to the other rotating shaft, and the second ring gear is mechanically connected to the energy output device. As a consequence, not only rotational energy from the first and second energy input/output devices but also rotational energy from the energy output device is transmitted to the two rotating shafts, so that it is possible to reduce rotational energy required of the first and second energy input/output devices, which in turn makes it possible to downsize the two devices.

To attain the above object, the invention according to claim 6 is a power plant 71 for driving two rotating shafts (left and right output shafts SRL, SRR in embodiments (the same applies hereinafter in this section)) which are differentially rotatable with each other, comprising a double pinion gear 106, 301 that is formed by a first pinion gear P1C, P1$c$ and a second pinion gear P2C, P2$c$ which are integrally formed with each other, a third pinion gear P3C, P3$c$ that is in mesh with the first pinion gear P1C, P1$c$, a fourth pinion gear P4C, P4$c$ that is in mesh with the second pinion gear P2C, P2$c$, a carrier member 105, 302 that is rotatable, the carrier member 105, 302 rotatably supporting the double pinion gear 106, 301 and the third and fourth pinion gears P3C, P3$c$, P4C, P4$c$, a first sun gear S1C, S1c that is rotatable and is in mesh with the third pinion gear P3C, P3$c$, a first ring gear R1C, R1$c$ that is rotatable and is in mesh with the first pinion gear P1C, P1$c$, the first ring gear R1C, R1$c$ being connected to one (right output shaft SRR) of the two rotating shafts, a second sun gear S2C, S2$c$ that is rotatable and is in mesh with the second pinion gear P2C, P2$c$, a second ring gear R2C, R2$c$ that is rotatable and is in mesh with the fourth pinion gear P4C, P4$c$, the second ring gear R2C, R2$c$ being connected to the other (left output shaft SRL) of the two rotating shafts, a first energy input/output device (first rotating electric machine 11) that is connected to the first sun gear S1C, S1c and is capable of inputting and outputting rotational energy, and a second energy input/output device (second rotating electric machine 12) that is connected to the second sun gear S2C, S2$c$ and is capable of inputting and outputting rotational energy.

With this arrangement, the double pinion gear and the third and fourth pinion gears are rotatably supported by the carrier member, the third and fourth pinion gears are in mesh with the first and second pinion gears of the double pinion gear. Further, the third pinion gear is in mesh with the first sun gear, and the first pinion gear is in mesh with the first ring gear. The second pinion gear is in mesh with the second sun gear, and the fourth pinion gear is in mesh with the second ring gear. From the above, the rotational speeds of the first sun gear, the first ring gear, the carrier member, the second ring gear, and the second sun gear are in a so-called collinear relationship, and in a collinear chart, are located on the same straight line in this order. The first and second sun gears are located outside the first and second ring gears, respectively.

Further, the first and second sun gears are connected to the first and second energy input/output devices, respectively. The first and second ring gears are connected to one rotating shaft (one of the two rotating shafts) and the other rotating shaft (the other of the two rotating shafts), respectively. With the above, it is possible to transmit rotational energy output from the first and second energy input/output devices to the two rotating shafts via the first and second sun gears, the first and second ring gears, and so forth, and properly drive both the rotating shafts. In this case, as described heretofore, the rotational speeds of the first sun gear, the first ring gear, the carrier member, the second ring gear, and the second sun gear are in the collinear relationship with each other, so that by controlling input and output of rotational energy to and from the first and second energy input/output devices, it is possible to properly control rotational energy (torque) distributed to the two rotating shafts.

Furthermore, differently from the above-described conventional power plant, not the sun gear but the first and second ring gears are connected to one and the other rotating shafts, respectively, and therefore, similarly to the invention according to claim 1, it is possible to set the tooth widths of the first and second ring gears to relatively small values, whereby it is possible to downsize the power plant.

Further, as described above, as is apparent from the fact that in the collinear chart, the first and second sun gears are located outside the first and second ring gears, respectively, respective torques transmitted from the first and second energy input/output devices to the first and second sun gears are transmitted to the two rotating shafts in increased states. This makes it possible to set the tooth widths of the first and second sun gears to relatively small values, which also makes it possible to downsize the power plant.

Furthermore, the first and fourth pinion gears are in mesh with the first and second ring gears, so that similarly to the invention according to claim 1, it is possible to downsize the bearings supporting the first and fourth pinion gears, which also makes it possible to downsize the power plant.

The invention according to claim. 7 is the power plant 71 according to claim 6, wherein the first pinion gear P1C, P1c and the second pinion gear P2C, P2c have the same diameter and the same number of gear teeth.

With this configuration, the first pinion gear and the second pinion gear have the same diameter and the same number of gear teeth. As a consequence, for example, when both the first and second pinion gears are formed by spur gears, both the gears can be machined by the same cutter, whereas when they are formed by helical gears, they can be machined by cutters which are the same in specifications but different only in the direction of torsion. Therefore, the first and second pinion gears are excellent in productivity. Further, in this case, they can be formed by single pinion gears relatively long in an axial direction. This makes it possible to further improve productivity.

The invention according to claim 8 is the power plant 71 according to claim 7, wherein the first ring gear R1C, R1c and the second ring gear R2C, R2c have the same number of gear teeth.

With this configuration, the numbers of gear teeth of the first and second pinion gears are the same, and the numbers of gear teeth of the first and second ring gears are the same. As a consequence, as is apparent from an equation (7), referred to hereinafter, in a collinear chart (see FIG. 16, referred to hereinafter), the distance from the carrier member to the first ring gear, and the distance from the carrier member to the second ring gear become equal to each other, whereby it is possible to cause a torque distribution ratio at which torque is distributed from the carrier member to the first and second ring gears to be 1:1.

The invention according to claim 9 is the power plant 71 according to claim 8, wherein the first sun gear S1C, S1c and the second sun gear S2C, S2c have the same number of gear teeth.

With this configuration, the numbers of gear teeth of the first and second ring gears are the same, the numbers of gear teeth of the first and second sun gears are the same, the numbers of gear teeth of the first and second pinion gears are the same, and the numbers of gear teeth of the third and fourth pinion gears are the same. As a consequence, as is apparent from equations (5) and (6), referred to hereinafter, it is possible to easily set first and second lever ratios α B and βB shown in FIG. 16 to the same value. The first lever ratio αB represents a ratio of torque transmitted to the first and second ring gears via the second sun gear, to torque transmitted to the second sun gear, and the second lever ratio βB represents a ratio of torque transmitted to the first and second ring gears via the first sun gear, to torque transmitted to the first sun gear. Therefore, it is possible to more properly control rotational energy distributed to the two rotating shafts from the first and second energy input/output devices.

The invention according to claim 10 is the power plant 71 according to any one of claims 6 to 9, further comprising an energy output device that is configured to be capable of outputting rotational energy, and is provided separately from the first and second energy input/output devices, wherein the carrier member 105 is mechanically connected to the energy output device.

With this arrangement, the carrier member out of the first sun gear, the first ring gear, the carrier member, the second ring gear, and the second sun gear the rotational speeds of which are in the collinear relationship with each other, is connected to the energy output device. As a consequence, not only rotational energy from the first and second energy input/output devices but also rotational energy from the energy output device is transmitted to the two rotating shafts, so that it is possible to reduce rotational energy required of the first and second energy input/output devices, which in turn makes it possible to downsize the energy input/output devices.

To attain the above object, the invention according to claim 11 is a power plant 81 for driving two rotating shafts (left and right output shafts SRI, SRR in embodiments (the same applies hereinafter in this section)) which are differentially rotatable with each other, comprising a double pinion gear 202 that is formed by a first pinion gear P1D and a second pinion gear P2D which are integrally formed with each other, a pinion gear PD that is in mesh with the first pinion gear P1D, a carrier member 201 that is rotatable, the carrier member 201 rotatably supporting the double pinion gear 202 and the pinion gear PD, a first sun gear S1D that is rotatable and is in mesh with the pinion gear PD, a first ring gear R1D that is rotatable and is in mesh with the first pinion gear P1D, the first ring gear R1D being connected to one (right output shaft SRR) of the two rotating shafts, a second sun gear S2D that is rotatable and is in mesh with the second pinion gear P2D, a second ring gear R2D that is rotatable and that is in mesh with the second pinion gear P2D, the second ring gear R2D being connected to the other (left output shaft SRL) of the two rotating shafts, a first energy input/output device (first rotating electric machine 11) that is connected to the first sun gear S1D and is capable of inputting and outputting rotational energy, and a second energy input/output device (second rotating electric machine 12) that is connected to the second sun gear S2D and is capable of inputting and outputting rotational energy.

With this arrangement, the double pinion gear and the pinion gear are rotatably supported by the carrier member. The first pinion gear of the double pinion gear is in mesh with the pinion gear, the pinion gear is in mesh with the first sun gear, and the second pinion gear is in mesh with the second sun gear. Further, the first and second pinion gears are in mesh with the first and second ring gears, respectively. From the above, the rotational speeds of the first sun gear, one of the first and second ring gears, the other of the first and second ring gears, the carrier member, and the second sun gear are in a so-called collinear relationship, and are located on the same straight line in a collinear chart in this order. The first and second sun gears are located outside the first and second ring gears, respectively.

Further, the first and second sun gears are connected to the first and second energy input/output devices, respectively, and the first and second ring gears are connected to one rotating shaft (one of the two rotating shafts) and the other rotating shaft (the other of the two rotating shafts), respectively. From the above, it is possible to transmit rotational energy output from the first and second energy input/output devices to the two rotating shafts via the first and second sun gears, the first and second ring gears, and so forth, and properly drive both the rotating shafts. In this case, as described heretofore, the rotational speeds of the first sun gear, one of the ring gears, the other thereof, the carrier member, and the second sun gear are in a collinear relationship with each other, so that by controlling input and output of rotational energy to and from the first and second energy input/output devices, it is possible to properly control rotational energy (torque) distributed to the two rotating shafts.

Furthermore, differently from the above-described conventional power plant, not the sun gear but the first and second ring gears are connected to one and the other of the rotating shafts, and therefore, similarly to the invention according to claim 1, it is possible to set the tooth widths of the first and second ring gears to relatively small values, whereby it is possible to downsize the power plant.

Further, as described hereinabove, as is apparent from the fact that in the collinear chart, the first and second sun gears are located outside the first and second ring gears, respectively, respective torques transmitted from the first and second energy input/output devices to the first and second sun gears are transmitted to the two rotating shafts in increased states. This makes it possible to set the tooth widths of the first and second sun gears to relatively small values, which also makes it possible to downsize the power plant.

Furthermore, the first and second pinion gears are in mesh with the first and second ring gears, respectively, so that similarly to the invention according to claim 1, it is possible to downsize the bearings supporting the first and second pinion gears, which also makes it possible to downsize the power plant.

The invention according to claim 12 is the power plant 41, 51, 61, 71, 81 according to any one of claims 1 to 11, wherein the first and second energy input/output devices are rotating electric machines.

With this configuration, since general rotating electric machines are used as the first and second energy input/output devices, it is possible to construct the power plant easily and inexpensively, without using a special device.

The invention according to claim 13 is the power plant 1, 41, 51, 61, 71, 81 according to any one of claims 1 to 12, wherein the two rotating shafts are connected to two driven parts (left and right rear wheels WRL and WRR, left and right front wheels WFL and WFR) for propelling a means of transport (vehicle VFR, vehicle VAW).

With this arrangement, the two rotating shafts are connected to the two driven parts for propelling the means of transport, and hence as is apparent from the advantageous effects provided by the invention according to claims 1, 3, 6, 11, it is possible to properly control rotational energy (torque) distributed to the two driven parts, which in turn makes it possible to enhance mobility of the means of transport.

The invention according to claim 14 is the power plant 1, 41, 51, 61, 71, 81 according to claim 13, wherein one of the two driven parts is disposed on one side in a left-right direction with respect to a traveling direction of the means of transport, and the other of the two driven parts is disposed on the other side in the left-right direction.

With this arrangement, one of the two driven parts is disposed on one side in the left-right direction with respect to the traveling direction of the means of transport, and the other of the two driven parts is disposed on the other side in the left-right direction, so that as is apparent from the above-described advantageous effects provided by the invention according to claim 1, it is possible to enhance turnability of the means of transport.

The invention according to claim 15 is the power plant 1, 41, 51, 61, 71, 81 according to claim 13 or 14, wherein the means of transport is a vehicle, and the driven parts are wheels of the vehicle.

With this configuration, it is possible to effectively obtain advantageous effects provided by the invention according to claim 13 or 14.

MODE FOR CARRYING OUT INVENTION

Figure 1:
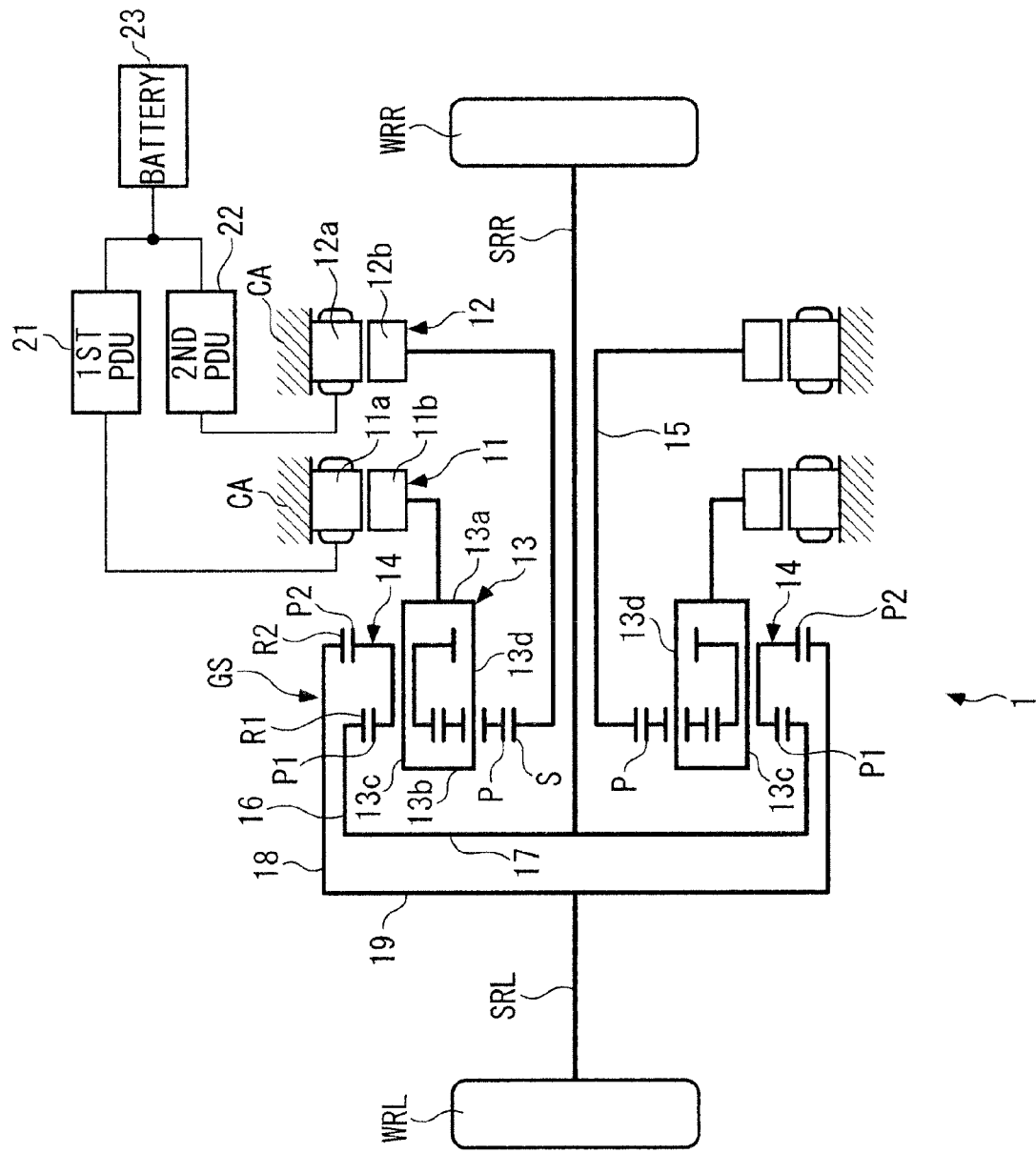
[FIG. 1] A diagram schematically showing a power plant according to a first embodiment of the present invention together with left and right rear wheels of a vehicle to which the power plant is applied.

The invention will now be described in detail with reference to drawings showing a preferred embodiment thereof. FIG. 1 shows a power plant 1 according to a first embodiment, which drives left and right output shafts SRL and SRR of a four-wheel vehicle (not shown), and is mounted in a rear part of the vehicle. These left and right output shafts SRL and SRR are arranged coaxially with each other, and are connected to left and right rear wheels WRL and WRR, respectively. Further, an internal combustion engine (hereinafter referred to as the "engine") as a motive power source is mounted in a front part of the vehicle. The engine is a gasoline engine, and is connected to left and right front wheels (not shown) of the vehicle e.g. via a transmission (not shown) for driving the left and right front wheels.

The power plant 1 includes a gear unit GS, a first rotating electric machine 11 and a second rotating electric machine 12 as motive power sources. The gear unit GS transmits torque between the first and second rotating electric machines 11 and 12, and the left and right output shafts SRL and SRR, and is comprised of a carrier member 13, double pinion gears 14, a sun gear S pinion gears P, a first ring gear R1, and a second ring gear R2. The carrier member 13, the sun gear S, and the first and second ring gears R1 and R2 are arranged coaxially with the left and right output shafts SRL and SRR.

The carrier member 13 is comprised of a first root portion 13a and a second root portion 13b each having an annular plate shape, and four first support shafts 13c (only two of which are shown) and four second support shafts 13d (only two of which are shown), which are integrally formed with the root portions 13a and 13b. Further, the carrier member 13 is rotatably supported by a bearing (not shown), and a first rotating shaft 15, referred to hereinafter, and the right output shaft SRR are relatively rotatably disposed inward of the carrier member 13.

The first and second root portions 13a and 13b are arranged coaxially with each other, and are opposed to each other in an axial direction of the left and right output shafts SRL and SRR. The first and second support shafts 13c and 13d are arranged between the first and second root portions 13a and 13b, and extend in the axial direction of the left and right output shafts SRL and SRR. Further, each first support shaft 13c is located at a radially outer end of the first root portion 13a, and each second support shaft 13d is located at a radially inner end of the first root portion 13a. Furthermore, the four first support shafts 13c are located at equally-spaced intervals in a circumferential direction of the first root portion 13a. The same applied to the four second support shafts 13d.

The above-mentioned double pinion gears 14 are each comprised of a first pinion gear P1 and a second pinion gear P2 integrally formed with each other. The number of the double pinion gears 14 is 4 (only two of which are shown) which is equal to the number of the above-mentioned first support shafts 13c, and each double pinion gear 14 is rotatably supported on an associated one of the first support shafts 13c via a bearing (not shown). Note that the number of the double pinion gears 14 and the number of the first support shafts 13c are not limited to 4 but they can be set as desired. The first and second pinion gears 21 and P2 of each double pinion gear 14 are located on a left side portion and a right side portion of the associated first support shaft 13c, respectively, and have pitch circle diameters different from each other.

Further, the above-mentioned sun gear S, pinion gears P, and first pinion gear P1 of each double pinion gear 14 are radially arranged from inside in this order. The sun gear S is integrally mounted on the first rotating shaft 15 which is hollow cylindrical. The first rotating shaft 15 is rotatably supported by bearings (not shown). The right output shaft SRR and the carrier member 13 are relatively rotatably disposed inside and outside the first rotating shaft 15, respectively. The number of the pinion gears P is 4 (only two of which are shown) which is equal to the number of the second support shafts 13d of the carrier member 13, and each pinion gear P is rotatably supported on an associated one of the second support shafts 13d via a bearing (not shown). Further, the pinion gears P are in mesh with both the sun gear S and an associated one of the first pinion gears P1. Note that the number of the pinion gears P and the number of the second support shafts 13d are not limited to 4 but they can be set as desired.

The above-mentioned first ring gear R1 is formed by a so-called internal gear. The first ring gear. R1 is disposed around an outer periphery of the sun gear S, and is in mesh with the first pinion gears P1. Further, the first ring gear R1 is attached to the right output shaft SRR via a second rotating shaft 16 which is hollow cylindrical and a flange 17, and is rotatable in unison with the right output shaft SRR. The carrier member 13 and the first rotating shaft 15 are relatively rotatably arranged inward of the second rotating shaft 16.

The second ring gear R2 is formed by an internal gear, similarly to the first ring gear R1, and is in mesh with the second pinion gears P2 of the double pinion gears 14. Further, the second ring gear R2 is attached to the left output shaft SRL via a third rotating shaft 18 which is hollow cylindrical and a flange 19, and is rotatable in unison with the left output shaft SRL. The second rotating shaft 16, the carrier member 13, the first rotating shaft 15, and the right output shaft SRR are relatively rotatably arranged inward of the third rotating shaft 18.

The first rotating electric machine 11 is an AC motor, and includes a first stator 11a formed e.g. by a plurality of iron cores and coils, and a first rotor 11b formed e.g. by a plurality of magnets. The first rotating electric machine 11 is disposed coaxially with the left and right output shafts SRL and SRR, and is located between the gear unit GS and the right rear wheel WRR. The first stator 11a is fixed to an immovable casing CA. The first rotor 11b is disposed in a manner opposed to the first stator 11a, and is integrally attached to the carrier member 13 such that it is rotatable in unison with the carrier member 13. In the first rotating electric machine 11, when electric power is supplied to the first stator 11a, the supplied electric power is converted to motive power, and is output to the first rotor 11b. Further, when the motive power is input to the first rotor 11b, this motive power is converted to electric power (power generation), and is output to the first stator 11a.

Figure 2:
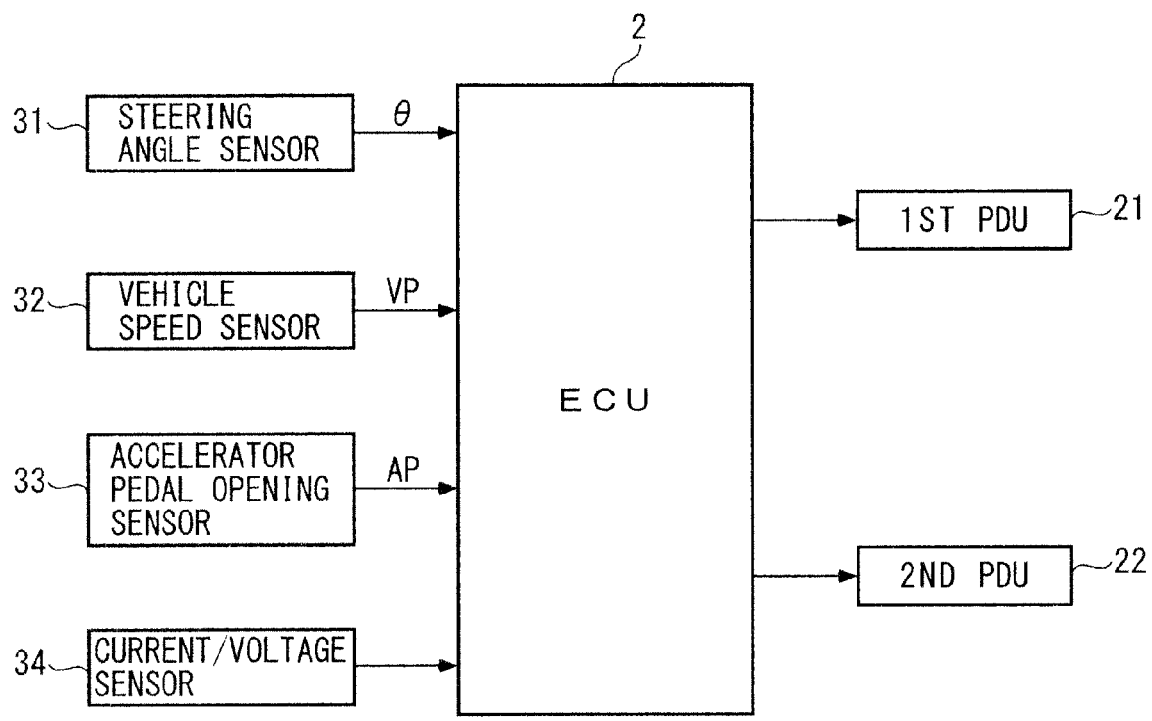
[FIG. 2] A block diagram of an ECU etc. of the power plant shown in FIG. 1.

Further, the first stator 11a is electrically connected to a battery 23 capable of being charged and discharged, via a first power drive unit (hereinafter referred to as the "first PDU") 21, and is capable of supplying and receiving electric energy to and from the battery 23. The first PDU 21 is formed by an electric circuit comprised e.g. of an inverter. As shown in FIG. 2, an ECU 2, described hereinafter, is electrically connected to the first PDU 21, The ECU 2 controls the first PDU 21 to thereby control electric power supplied to the first stator 11a, electric power generated by the first stator 11a, and the rotational speed of the first rotor 11b.

Similarly to the first rotating electric machine 11, the second rotating electric machine 12 is an AC motor, and includes a second stator 12a and a second rotor 12b. Further, the second rotating electric machine 12 is disposed coaxially with the left and right output shafts SRL and SRR, and is located between the first rotating electric machine 11 and the right rear wheel WRR. The second stator 12a and the second rotor 12b are constructed similarly to the first stator 11a and the first rotor 11b, respectively. Further, the second rotor 12b is integrally attached to the above-described first rotating shaft 15, and is rotatable in unison with the sun gear S. Furthermore, similarly to the first rotating electric machine 11, the second rotating electric machine 12 is capable of converting electric power supplied to the second stator 12a to motive power and outputting the motive power to the second rotor 12b, and is capable of converting the motive power input to the second rotor 12b to electric power and outputting the electric power to the second stator 12a.

Further, the second stator 12a is electrically connected to the battery 23 via a second power drive unit (hereinafter referred to as the "second PDU") 22, and is capable of supplying and receiving electric energy to and from the battery 23. Similarly to the first PDU 21, the second PDU 22 is formed by an electric circuit comprised e.g. of an inverter. The ECU 2 is electrically connected to the second PDU 22. The ECU 2 controls the second PDU 22 to thereby control electric power supplied to the second stator 12a, electric power generated by the second stator 12a, and the rotational speed of the second rotor 12b.

Hereinafter, converting electric power supplied to the first stator 11a (second stator 12a) to motive power and outputting the motive power from the first rotor 11b (second rotor 12b) is referred to as "powering", as deemed appropriate. Further, generating electric power by the first stator 11a (second stator 12a) using motive power input to the first rotor 11b (second rotor 12b) to thereby convert the motive power to electric power is referred to as "regeneration", as deemed appropriate.

As described above, in the power plant 1, since the carrier member 13 and the first rotor 11b are directly connected to each other, the rotational speeds of the two 13 and 11b are equal to each other. Further, since the first ring gear R1 is connected to the right output shaft SRR via the second rotating shaft 16 and the flange 17, the rotational speeds of the first ring gear R1 and the right output shaft SRR are equal to each other. Also, since the second ring gear R2 is connected to the left output shaft SRL via the third rotating shaft 18 and the flange 19, the rotational speeds of the second ring gear R2 and the left output shaft SRL are equal to each other. Further, since the sun gear S and the second rotor 12b are connected to each other via the first rotating shaft 15, the rotational speeds of the sun gear S and the second rotor 12b are equal to each other.

Further, since the gear unit GS is constructed as described above, the rotational speeds of the carrier member 13, the first ring gear R1, the second ring gear R2, and the sun gear S are in a collinear relationship in which the rotational speeds are located on the same straight line in a collinear chart, and the carrier member 13 and the sun gear S are located outside the first and second ring gears R1 and R2, respectively. From the above, the relationship between the rotational speeds of various rotary elements of the power plant 1 is expressed as in a collinear chart shown in FIG. 3. In the figure and other collinear charts, described hereinafter, the distance from a horizontal line indicative of 0 to a white circle shown on each vertical line corresponds to the rotational speed of each of the rotary elements. As is apparent from FIG. 3, the left and right output shafts SRL and SRR can be differentially rotated with each other.

Figure 3:
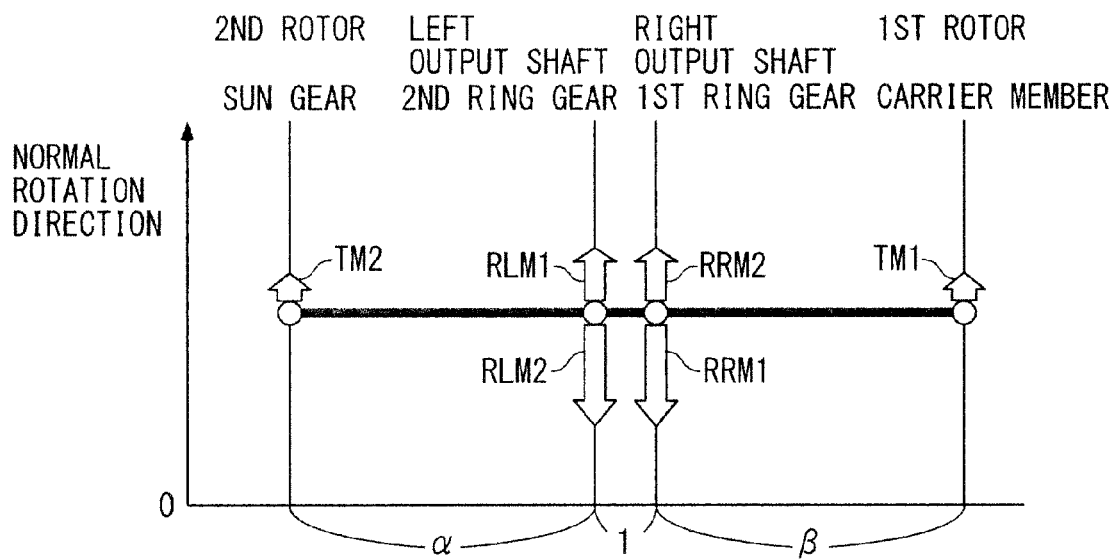
[FIG. 3 ] A collinear chart showing a rotational speed relationship and a torque balance relationship between various types of rotary elements of the power plant shown in FIG. 1, as to a state of the vehicle during straight forward traveling and during other than decelerating traveling.

In FIGS. 3, $\alpha$ and $\beta$ represent a first lever ratio and a second lever ratio, respectively, and are expressed by the following equations (1) and (2):

$$\alpha = \{ZR1(ZP1 \times ZR2 - ZS \times ZP2)\}/\{ZS(ZP2 \times ZR1 - ZP1 \times ZR2)\} \quad (1)$$

$$\beta = (ZP1 \times ZR2)/(ZP2 \times ZR1 - ZP1 \times ZR2) \quad (2)$$

wherein ZR1 represents the number of the gear teeth of the first ring gear R1, ZP1 represents the number of the gear teeth of the first pinion gear P1, and ZR2 represents the number of the gear teeth of the second ring gear R2. Further, ZS represents the number of the gear teeth of the sun gear S, and ZP2 represents the number of the gear teeth of the second pinion gear P2.

In the present embodiment, the number ZR1 of the gear teeth of the first ring gear R1, the number ZP1 of the gear teeth of the first pinion gear P1, the number ZR2 of the gear teeth of the second ring gear R2, the number ZS of the gear teeth of the sun gear S, and the number ZP2 of the gear teeth of the second pinion gear P2 (hereinafter referred to as the "the tooth numbers of the gears") are set as follows: The tooth numbers of the gears are set such that the first and second lever ratios $\alpha$ and $\beta$ take relatively large values (e.g. 2.5) on condition that one of the first and second rotors 11$b$ and 12$b$ does not perform reverse rotation within a range in which the left and right rear wheels WRL and WRR can be differentially rotated with each other. Further, as is apparent from the equations (1) and (2), the tooth numbers of the gears are set such that ZP1×ZR2−ZS×ZP2>0, and ZP2×ZR1−ZP1×ZR2>0 hold.

Note that in the collinear chart shown e.g. in FIG. 3, the carrier member 13 and the sun gear S are inevitably located outside the first and second ring gears R1 and R2, respectively, because of the construction of the gear unit GS. On the other hand, the first and second ring gears R1 and R2 are not necessarily located on the right side and the left side, respectively, as viewed in FIG. 3, but inversely, depending on the settings of the tooth numbers of the gears, they are located on the left side and the right side, respectively.

Further, as shown in FIG. 2, input to the ECU 2 are a detection signal indicative of a steering angle $\theta$ of a steering wheel (not shown) of the vehicle from a steering angle sensor 31, a detection signal indicative of a vehicle speed VP from a vehicle speed sensor 32, and a detection signal indicative of an operation amount of an accelerator pedal (not shown) of the vehicle (hereinafter referred to as the "accelerator pedal opening") AP from an accelerator pedal opening sensor 33. Further, detection signals indicative of current and voltage values of electric current flowing into and out of the battery 23 are input from a current/voltage sensor 34 to the ECU 2. The ECU 2 calculates a state of charge of the battery 23 based on the detection signals from the current/voltage sensor 34.

The ECU 2 is implemented by a microcomputer comprising an I/O interface, a CPU, a RAM, and a ROM. The ECU 2 controls the first and second rotating electric machines 11 and 12 based on the detection signals from the aforementioned sensors 31 to 34, according to control programs stored in the ROM. With this control, various operations of the power plant 1 are performed. Hereafter, a description will be given of the operations of the power plant 1 during straight forward traveling and during left and right turning of the vehicle.

During Straight Forward Traveling

During straight and constant-speed traveling or straight and accelerating traveling of the vehicle, powering is performed by both the first and second rotating electric machines 11 and 12, and electric power supplied from the battery 23 to the first and second stators 11$a$ and 12$a$ is controlled. FIG. 3 shows a rotational speed relationship and a torque balance relationship between various types of rotary elements in this case. In the figure, TM1 and TM2 represent output torques generated by the first and second rotors 11$b$ and 12$b$ along with the powering by the first and second rotating electric machines 11 and 12 (hereinafter referred to as the "first motor output torque" and the "second motor output torque"), respectively. Further, RLM1 and RRM1 represent reaction force torques acting on the left output shaft SRL and the right output shaft SRR along with the powering by the first rotating electric machine 11, respectively, and RLM2 and RRM2 represent reaction force torques acting on the left output shaft SRL and the right output shaft SRR along with the powering by the second rotating electric machine 12, respectively.

In this case, torque transmitted to the left output shaft SRL (hereinafter referred to as the "left output shaft-transmitted torque") is expressed by RLM2−RLM1 (RLM2>RLM1), and torque transmitted to the right output shaft SRR (hereinafter referred to as the "right output shaft-transmitted torque") is expressed by RRM1−RRM2 (RRM1>RRM2). The left and right output shafts SRL and SRR are driven in the direction of normal rotation together with the left and right rear wheels WRL and WRR. Further, electric power supplied to the first and second stators 11$a$ and 12$a$ are controlled such that the left output shaft-transmitted torque and the right output shaft-transmitted torque become the same demanded torque. This demanded torque is calculated by searching a predetermined map (not shown) according to the detected accelerator pedal opening AP. Furthermore, an execution condition for executing the above-described powering by the first and second rotating electric machines 11 and 12 is e.g. a condition that the engine is being assisted by the first and second rotating electric machines 11 and 12 (hereinafter referred to as "during the motor assist"), or a condition that the vehicle is being driven only by the first and second rotating electric machines 11 and 12 without using the engine (hereinafter referred to as "during the EV traveling") and also a calculated state of charge of the battery 23 is higher than a lower limit value. In this case, the fact that the state of charge of the battery 23 is higher than the lower limit value indicates that the battery 23 is capable of being discharged.

Figure 4:
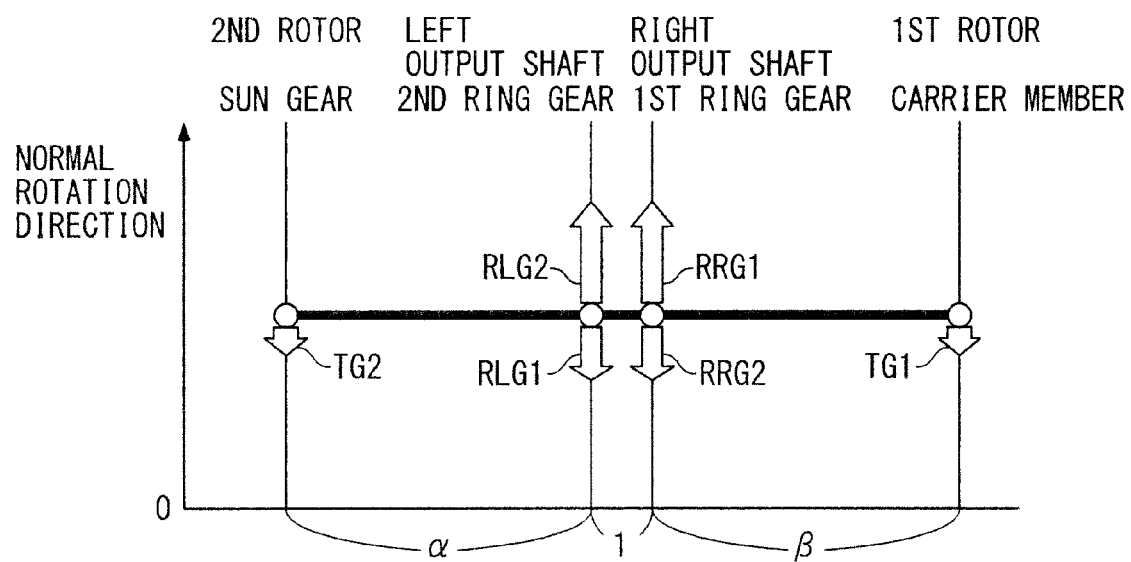
[FIG. 4] A collinear chart showing a rotational speed relationship and a torque balance relationship between the various types of rotary elements of the power plant shown in FIG. 1, as to a state of the vehicle during straight forward traveling and during decelerating traveling.

Further, during straight forward traveling and decelerating traveling of the vehicle, regeneration is performed by both the first and second rotating electric machines 11 and 12, and regenerated electric power is charged into the battery 23 and is controlled. FIG. 4 shows a rotational speed relationship and a torque balance relationship between the various types of rotary elements in this case. In the figure, TG1 and TG2 represent braking torques generated by the first and second rotors 11$b$ and 12$b$ along with the regeneration by the first and second rotating electric machines 11 and 12 (hereinafter referred to as the "first motor braking torque" and the "second motor braking torque"), respectively. Further, RLG1 and RRG1 represent reaction force torques acting on the left output shaft SRL and the right output shaft SRR along with the regeneration by the first rotating electric machine 11, and RLG2 and RRG2 represent reaction force torques acting on the left output shaft SRL and the right output shaft SRR along with the regeneration by the second rotating electric machine 12.

In this case, the left output shaft-transmitted torque is expressed by −RLG2+RLG1 (RLG2>RLG1), and the right output shaft-transmitted torque is expressed by −RRG1+RRG2 (RRG1>RRG2). The braking torque acts on the left and right output shafts SRL and SRR, and the vehicle is decelerated. Further, the electric power regenerated by the first and second rotating electric machines 11 and 12 is controlled such that the same braking torque acts on the left and right output shafts SRL and SRR. Furthermore, an execution condition for executing the above-described regeneration by the first and second rotating electric machines 11 and 12 is e.g. a condition that the state of charge of the battery 23 is lower than an upper limit value. In this case, the fact that the state of charge of the battery 23 is lower than the upper limit value indicates that the battery 23 is capable of being charged.

During Right Turning

During right turning of the vehicle, when a clockwise yaw moment for causing the vehicle to perform right turning is increased, yaw moment-increasing control for right turning is executed. First yaw moment-increasing control to fourth yaw moment-increasing control are provided for the yaw moment-increasing control. Hereinafter, a description will be sequentially given of the first yaw moment-increasing control to the fourth yaw moment-increasing control. First, during the first yaw moment-increasing control, powering is performed by both the first and second rotating electric machines 11 and 12, and the electric power supplied to the first and second stators 11a and 12a is controlled such that the second motor output torque TM2 becomes larger than the first motor output torque TM1.

With this control, as is apparent from the above-described torque balance relationship shown in FIG. 3, the left output shaft-transmitted torque becomes larger than the right output shaft-transmitted torque, whereby the clockwise yaw moment of the vehicle is increased. In this case, the electric power supplied to the first and second stators 11a and 12a is controlled according to the detected steering angle θ, vehicle speed VP, and accelerator pedal opening AP. Note that an execution condition for executing the first yaw moment-increasing control is e.g. a condition that it is during the motor assist (the engine is being assisted by the first and second rotating electric machines 11 and 12) or a condition that it is during the EV traveling (the vehicle is being driven only by the first and second rotating electric machines 11 and 12) and also the state of charge of the battery 23 is higher than the lower limit value.

During the second yaw moment-increasing control, regeneration is performed by both the first and second rotating electric machines 11 and 12, and the electric power regenerated by the first and second rotating electric machines 11 and 12 is charged into the battery 23. In this case, the electric power regenerated by the first and second rotating electric machines 11 and 12 is controlled such that the first motor braking torque TG1 becomes larger than the second motor braking torque TG2.

With this control, as is apparent from the above-described torque balance relationship shown in FIG. 4, the braking torque acting on the right output shaft SRR becomes larger than the braking torque acting on the left output shaft SRL, so that the clockwise yaw moment of the vehicle is increased. In this case, the electric power regenerated by the first and second rotating electric machines 11 and 12 is controlled according to the steering angle θ, the vehicle speed. VP, and so forth. Note that an execution condition for executing the second yaw moment-increasing control is e.g. a condition that it is during deceleration traveling of the vehicle and also the state of charge of the battery 23 is smaller than the upper limit value.

Figure 5:
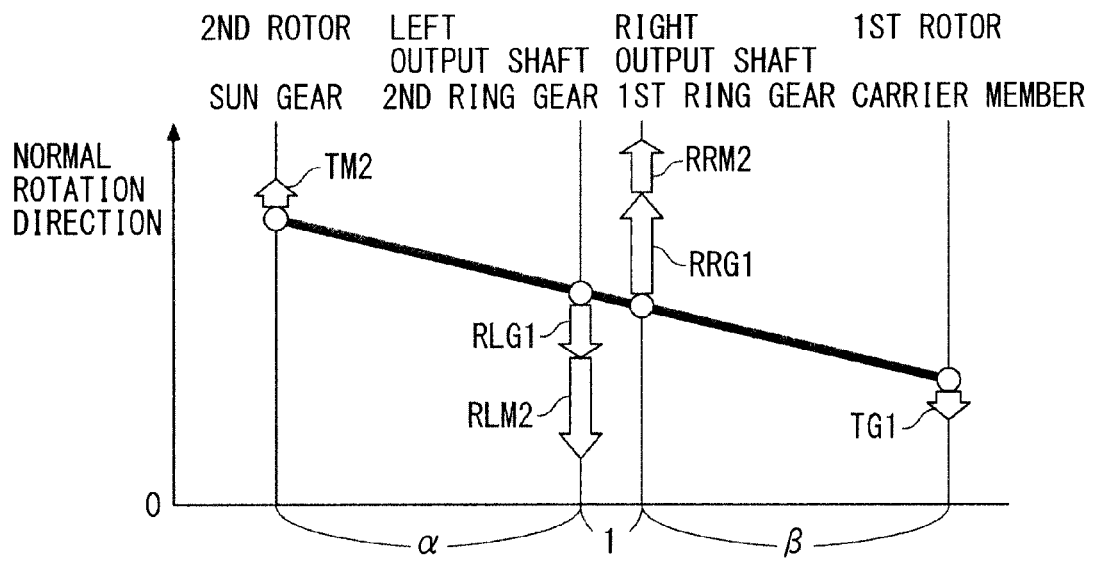
[FIG. 5] A collinear chart showing a rotational speed relationship and a torque balance relationship between the various types of rotary elements of the power plant shown in FIG. 1, as to during third yaw moment-increasing control for right turning.

During the third yaw moment-increasing control, regeneration is performed by the first rotating electric machine 11, and powering is performed by the second rotating electric machine 12. FIG. 5 shows a rotational speed relationship and a torque balance relationship between the various types of rotary elements in this case. As described above with reference to FIG. 3, in FIG. 5, TM2 represents the second motor output torque, and RLM2 and RRM2 represent the reaction force torques acting on the left output shaft SRL and the right output shaft SRR along with the powering by the second rotating electric machine 12, respectively. Further, as described above with reference to FIG. 4, in FIG. 5, TG1 represents the first motor braking torque, and RLG1 and RRG1 represent the reaction force torques acting on the left output shaft SRL and the right output shaft SRR along with the regeneration by the first rotating electric machine 11.

In this case, the left output shaft-transmitted torque is expressed by RLG1+RLM2, and the right output shaft-transmitted torque is expressed by −(RRG1+RRM2). As described above, the left output shaft-transmitted torque is increased, and the braking torque acts on the right output shaft SRR, so that the clockwise yaw moment of the vehicle is increased. In this case as well, electric power regenerated by the first rotating electric machine 11 and electric power supplied to the second stator 12a are controlled according to the steering angle θ, the vehicle speed VP, and the accelerator pedal opening AP.

Note that an execution condition for executing the third yaw moment-increasing control is e.g. the following first increasing condition or second increasing condition:

The first increasing condition: The vehicle is being driven by the engine, and also the state of charge of the battery 23 is not lower than an upper limit value.

The second increasing condition: The vehicle is being driven by the engine, the state of charge of the battery 23 is lower than the upper limit value, and also braking torque demanded of the first rotating electric machine 11 is not smaller than a predetermined first upper limit torque.

In this case, when the first increasing condition is satisfied, i.e. when the state of charge of the battery 23 is not lower than the upper limit value, the battery 23 cannot be charged, and hence all the electric power regenerated by the first rotating electric machine 11 is supplied to the second stator 12a without being charged into the battery 23. On the other hand, when the second increasing condition is satisfied, part of the electric power regenerated by the first rotating electric machine 11 is charged into the battery 23, and the remainder is supplied to the second stator 12a. In this case, the second motor output torque TM2 is controlled such that an insufficient amount of the first motor braking torque TG1 with respect to the demanded braking torque is compensated for.

During the fourth yaw moment-increasing control, the zero torque control is performed on the second rotating electric machine 12, and regeneration is performed by the first rotating electric machine 11 to charge regenerated electric power into the battery 23. The zero torque control prevents dragging losses from being caused by regeneration by the second rotating electric machine 12. In this case, only the first motor braking torque TG1 is generated, so that as is apparent from FIG. 5, the left output shaft-transmitted torque is represented by RLG1, and the right output shaft-transmitted torque is represented by −RRG1. As described above, the left output shaft-transmitted torque is increased, and the braking torque acts on the right output shaft SRR, so that the clockwise yaw moment of the vehicle is increased. In this case as well, the electric power regenerated by the first rotating electric machine 11 is controlled according to the steering angle θ, the vehicle speed VP, and the accelerator pedal opening AP. Note that an execution condition for executing the fourth yaw moment-increasing control is e.g. a condition that the vehicle is being driven by the engine, the state of charge of the battery 23 is lower than the upper limit value, and also the braking torque demanded of the first rotating electric machine 11 is smaller than the above-mentioned first upper limit torque.

During the right turning of the vehicle, when the clockwise yaw moment for causing the vehicle to perform right turning is reduced, yaw moment-reducing control for right turning is executed. First yaw moment-reducing control to fourth yaw moment-reducing control are provided for the yaw moment-reducing control. Hereinafter, a description will be sequentially given of the first yaw moment-reducing control to fourth yaw moment-reducing control. First, during the first yaw moment-reducing control, powering is performed by both the first and second rotating electric machines 11 and 12, and electric power supplied to the first and second stators 11a and 12a is controlled such that the first motor output torque TM1 becomes larger than the second motor output torque TM2.

With this control, as is apparent from the above-described torque balance relationship shown in FIG. 3, the right output shaft-transmitted torque becomes larger than the left output shaft-transmitted torque, so that the clockwise yaw moment of the vehicle is reduced in this case, the electric power supplied to the first and second stators 11a and 12a is controlled according to the steering angle θ, the vehicle speed VP, and the accelerator pedal opening AP. Note that an execution condition for executing the first yaw moment-reducing control is e.g. a condition that it is during the motor assist or during the EV traveling, and also the state of charge of the battery 23 is higher than the lower limit value.

During the second yaw moment-reducing control, regeneration is performed by both the first and second rotating electric machines 11 and 12, and the electric power regenerated by the first and second rotating electric machines 11 and 12 is charged into the battery 23. In this case, the electric power regenerated by the first and second rotating electric machines 11 and 12 is controlled such that the second motor braking torque TG2 becomes larger than the first motor braking torque TG1.

With this control, as is apparent from the above-described torque balance relationship shown in FIG. 4, the braking torque acting on the left output shaft SRL becomes larger than the braking torque acting on the right output shaft SRR, so that the clockwise yaw moment of the vehicle is reduced. In this case, the electric power regenerated by the first and second rotating electric machines 11 and 12 is controlled according to the steering angle θ and the vehicle speed VP. Note that an execution condition for executing the second yaw moment-reducing control is e.g. a condition that it is during deceleration traveling of the vehicle, and also the state of charge of the battery 23 is lower than the upper limit value.

Figure 6:
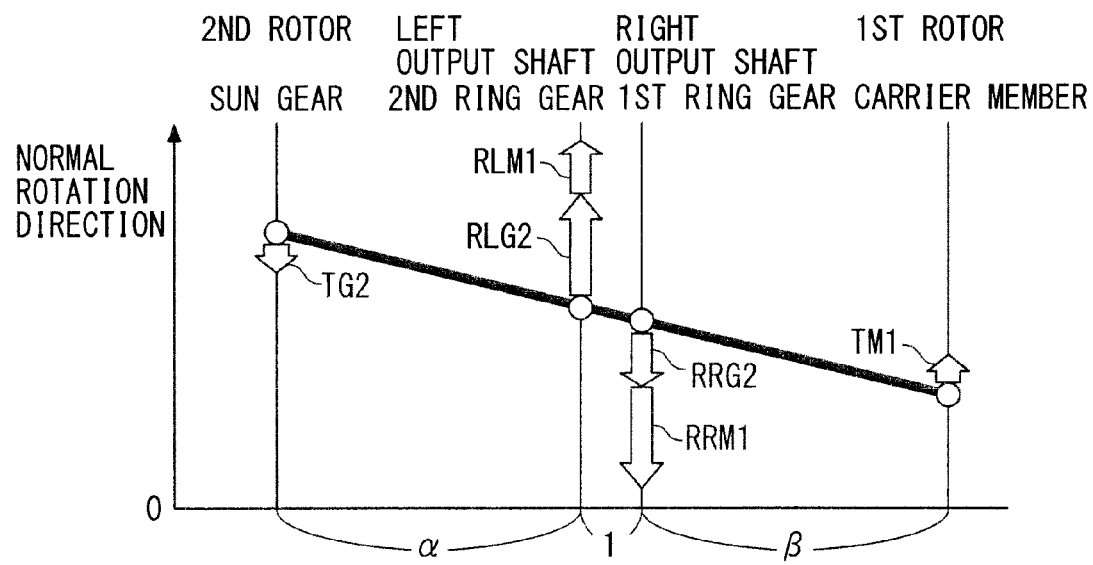
[FIG. 6] A collinear chart showing a rotational speed relationship and a torque balance relationship between the various types of rotary elements of the power plant shown in FIG. 1, as to during third yaw moment-reducing control for right turning.

During the third yaw moment-reducing control, powering is performed by the first rotating electric machine 11, and regeneration is performed by the second rotating electric machine 12. FIG. 6 shows a rotational speed relationship and a torque balance relationship between the various types of rotary elements in this case. As described above with reference to FIG. 3, in FIG. 6, TM1 represents the first motor output torque, and RLM1 and RRM1 represent the reaction force torques acting on the left output shaft SRL and the right output shaft SRR along with the powering by the first rotating electric machine 11, respectively. Further, as described above with reference to FIG. 4, in FIG. 6, TG2 represents the second motor braking torque, and RLG2 and RRG2 represent the reaction force torques acting on the left output shaft SRL and the right output shaft SRR along with the regeneration by the second rotating electric machine 12, respectively.

In this case, the left output shaft-transmitted torque is expressed by −(RLM1+RLG2), and the right output shaft-transmitted torque is expressed by RRM1+RRG2. As described above, the braking torque acts on the left output shaft SRL, and the right output shaft-transmitted torque is increased, so that the clockwise yaw moment of the vehicle is reduced. In this case as well, electric power supplied to the first stator 11a and electric power regenerated by the second rotating electric machine 12 are controlled according to the steering angle θ and the vehicle speed VP.

Note that an execution condition for executing the third yaw moment-reducing control is e.g. the following first reducing condition or second reducing condition:

The first reducing condition: It is during deceleration traveling of the vehicle, and also the state of charge of the battery 23 is not lower than the upper limit value.

The second reducing condition: It is during deceleration traveling of the vehicle, the state of charge of the battery 23 is lower than the upper limit value, and also braking torque demanded of the second rotating electric machine 12 is not lower than a predetermined second upper limit torque.

In this case, when the first reducing condition is satisfied, i.e. when the state of charge of the battery 23 is not lower than the upper limit value, the battery 23 cannot be charged, and hence all the electric power regenerated by the second rotating electric machine 12 is supplied to the first stator 11a without being charged into the battery 23. On the other hand, when the second reducing condition is satisfied, part of the electric power regenerated by the second rotating electric machine 12 is charged into the battery 23, and the remainder is supplied to the first stator 11a. In this case, the first motor output torque TM1 is controlled such that an insufficient amount of the second motor braking torque TG2 with respect to the demanded braking torque is compensated for.

During the fourth yaw moment-reducing control, the zero torque control is performed on the first rotating electric machine 11, and regeneration is performed by the second rotating electric machine 12. The electric power regenerated by the second rotating electric machine 12 is charged into the battery 23. In this case, only the second motor braking torque TG2 is generated, so that as is apparent from FIG. 6, the left output shaft-transmitted torque is represented by −RLG2, and the right output shaft-transmitted torque is represented by RRG2. As described above, the braking torque acts on the left output shaft SRL, and the right output shaft-transmitted torque is increased, so that the clockwise yaw moment of the vehicle is reduced. In this case as well, the electric power regenerated by the second rotating electric machine 12 is controlled according to the steering angle θ and the vehicle speed VP. Note that an execution condition for executing the fourth yaw moment-reducing control is e.g. a condition that it is during deceleration traveling of the vehicle, the state of charge of the battery 23 is lower than the upper limit value, and also the braking torque demanded of the second rotating electric machine 12 is smaller than the above-mentioned second upper limit torque.

Note that during the left turning of the vehicle, when a counterclockwise yaw moment for causing the vehicle to perform left turning is increased, yaw moment-increasing control for left turning is executed, whereas when the counterclockwise yaw moment is reduced, yaw moment-reducing control for left turning is executed. The above-described yaw moment-increasing control and yaw moment-reducing control for left turning are executed substantially similarly to the yaw moment-increasing control and yaw moment-reducing control for right turning, respectively, and detailed description thereof is omitted.

Further, the correspondence between various elements of the present embodiment and various elements of the present invention is as follows: The right output shaft SRR and the left output shaft SRL of the present embodiment correspond to one and the other of the two rotating shafts of the present invention, respectively, and the first and second rotating electric machines 11 and 12 of the present embodiment correspond to first and second energy input/output devices of the present invention, respectively. Further, the left and right rear wheels WRL and WRR of the present embodiment correspond to two driven parts of the present invention.

As described above, according to the first embodiment, the double pinion gears 14 and the pinion gears P are rotatably supported by the carrier member 13, and the first pinion gears P1 of the double pinion gears 14 are in mesh with the pinion gears P. Further, the pinion gears P are in mesh with the sun gear S, and the first and second pinion gears P1 and P2 of the double pinion gears 14 are in mesh with the first and second ring gears R1 and R2, respectively.

Furthermore, these carrier member 13 and sun gear S are connected to the first and second rotating electric machines 11 and 12, respectively, and the first and second ring gears R1 and R2 are connected to the right output shaft SRR and the left output shaft SRL, respectively. With the above, it is possible to transmit the first and second motor output torques TM1 and TM2 and the first and second motor braking torques TG1 and TG2 to the left and right output shafts SRL and SRR via the carrier member 13, the sun gear 5, the first and second ring gears R1 and R2, and so forth, and properly drive (brake) the two output shafts SRL and SRR. In this case, as described above with reference to FIG. 3 etc., the rotational speeds of the carrier member 13, the sun gear S, and the first and second ring gears R1 and R2 are in the collinear relationship, so that by controlling the first and second rotating electric machines 11 and 12, it is possible to properly control torque distributed to the left and right output shafts SRL and SRR, and in turn enhance traveling performance including turnability of the vehicle.

Further, differently from the above-described conventional power plant, the first and second ring gears R1 and R2 are connected to the right output shaft SRR and the left output shaft SRL, respectively, and hence it is possible to set the tooth widths of the gears R1 and R2 to relatively small values, whereby it is possible to downsize the power plant 1. Further, in the collinear charts (in FIG. 3 etc.), the carrier member 13 and the sun gear S are located outside the first and second ring gears R1 and R2, respectively, so that respective torques transmitted from the first and second rotating electric machines 11 and 12 to the carrier member 13 and the sun gear S are transmitted to the left and right output shafts SRL and SRR in increased states. This makes it possible to downsize the carrier member 13, and set the tooth width of the sun gear S to a relatively small value, which also makes it possible to downsize the power plant 1.

Figure 20:
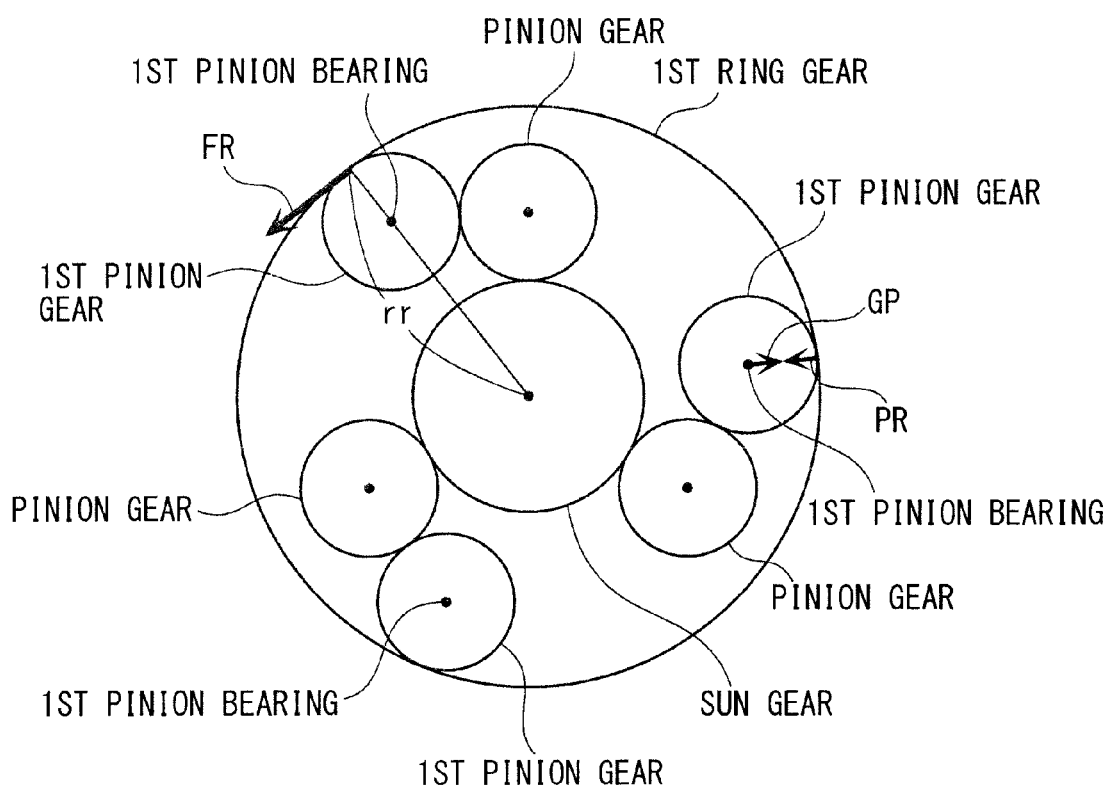
[FIG. 20] A diagram useful in explaining advantageous effects provided by the present invention.

Furthermore, as described above with reference to FIG. 20, a centrifugal force acts on the bearing supporting the first pinion gear P1 (hereinafter referred to as the "first bearing") along with rotation of the first pinion gear P1. Further, an engagement reaction force acts on the first pinion gear P1 from the first ring gear R1 along with transmission of torque from the first ring gear R1 to the right output shaft SRR. This engagement reaction force acts on the first bearing in a direction opposite to the direction of the above-described centrifugal force. As a consequence, since the above centrifugal force and engagement reaction force act on the first bearing such that they are offset by each other, it is possible to downsize the first bearing in comparison with the above-described conventional pinion bearing.

The same applies to the bearing supporting the second pinion gear P2 (hereinafter referred to as the "second bearings"). That is, the centrifugal force acts on the second bearing along with rotation of the second pinion gear P2. Further, the engagement reaction force from the second ring gear R2 acts on the second pinion gear P2 along with transmission of torque from the second ring gear R2 to the left output shaft SRL. Since the above centrifugal force and engagement reaction force act on the second bearing such that they are offset by each other, it is possible to downsize the second bearings. Also by downsizing the first and second bearings, it is possible to downsize the power plant 1.

Figure 7:
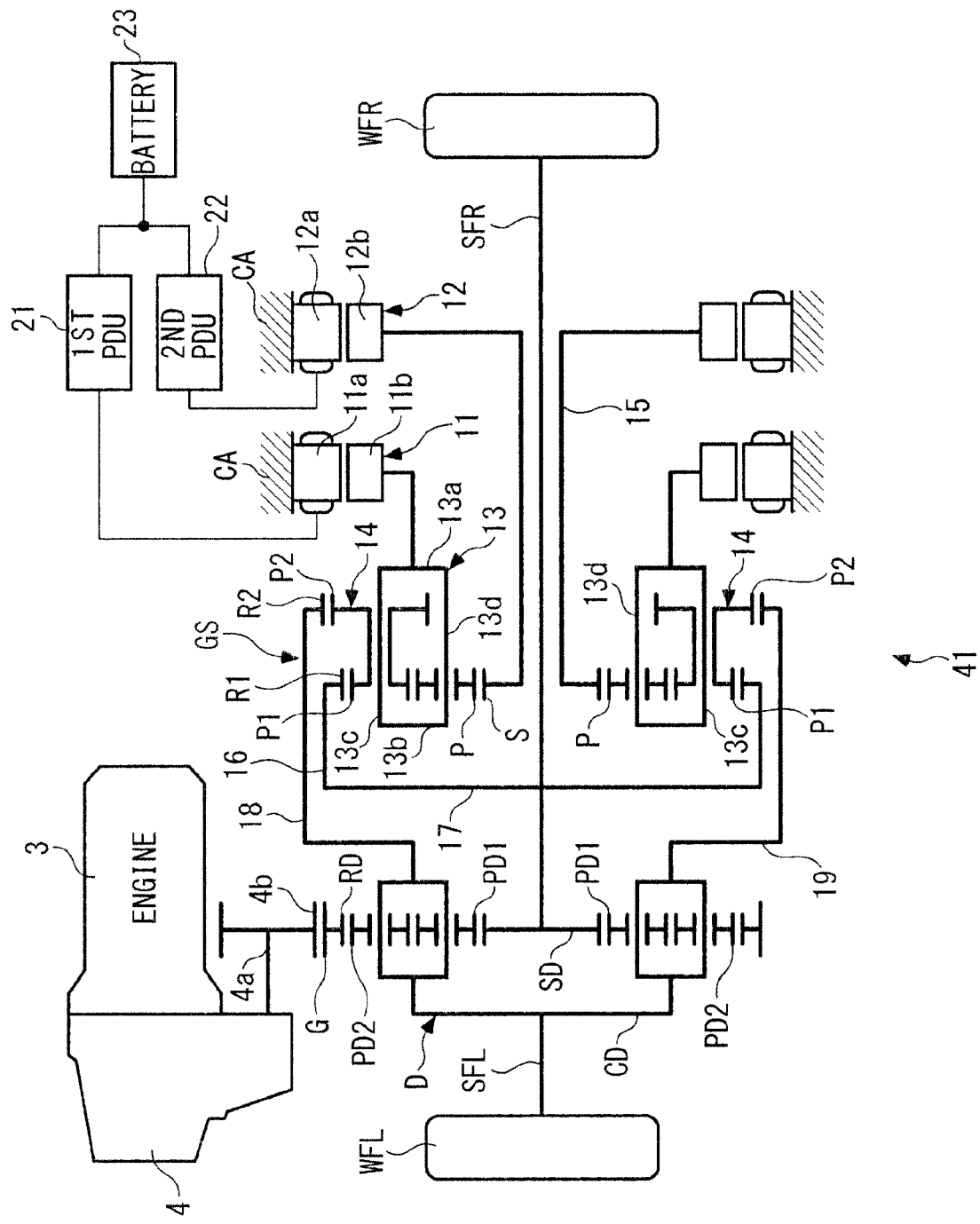
[FIG. 7] A diagram schematically showing a power plant according to a second embodiment of the present invention together with left and right front wheels of a vehicle to which the power plant is applied.

Next, a power plant 41 according to a second embodiment of the present invention will be described with reference to FIG. 7. Differently from the first embodiment, this power plant 41 drives not the left and right output shafts SRL and SRR connected to the respective left and right rear wheels WRL and WRR but left and right output shafts SFL and SFR connected to respective left and right front wheels NFL and WFR, and is distinguished from the first embodiment mainly in that the power plant 41 further includes an engine 3 as a motive power source, a transmission 4, and a differential gear D, in addition to the above-described gear unit GS and so forth. In FIG. 7, the same component elements as those of the first embodiment are denoted by the same reference numerals. The following description is mainly given of different points from the first embodiment.

The engine 3 is a gasoline engine, and is installed in a front part of a four-wheel vehicle. The transmission 4 is connected to a crankshaft (not shown) of the engine 3. The transmission 4 is a stepped automatic transmission, and has operation thereof controlled by the ECU 2, to thereby transmit the motive power of the engine 3 to an output shaft 4a in a state changed in speed.

The differential gear D is a planetary gear unit of a so-called double pinion type, and is comprised of a sun gear SD, a ring gear RD disposed around an outer periphery of the sun gear SD, a plurality of first pinion gears PD1 in mesh with the sun gear SD, a plurality of second pinion gears PD2 in mesh with the first pinion gears PD1 and the ring gear RD, and a carrier CD rotatably supporting the first and second pinion gears PD1 and PD2. The differential gear D, the gear unit GS, the first and second rotating electric machines 11 and 12 are arranged coaxially with the left and right output shafts Sit and SFR, between the left and right front wheels WFL and WFR, from the left side in this order.

Further, an externally toothed gear G is formed around an outer periphery of the ring gear RD of the differential gear D. This externally toothed gear G is in mesh with a gear 4b integrally attached to the output shaft 4a of the transmission 4. Thus, the ring gear RD is connected to the engine 3 via the transmission 4.

Furthermore, the sun gear SD of the differential gear D is integrally attached to the above-mentioned flange 17 via a rotating shaft. The flange 17 is integrally attached to the right output shaft SFR, and is connected to the first ring gear R1 via the second rotating shaft 16, similarly to the first embodiment. Thus, the sun gear SD is connected to a rotational energy transmission path between the first ring gear R1 and the right output shaft SFR.

A left end of the carrier CD of the differential gear C is integrally attached to the left output shaft SFL, and a right end of the carrier CD is connected to the second ring gear R2 via the above-mentioned flange 19 and third rotating shaft 18. Thus, the carrier CD is provided in a rotational energy transmission path between the second ring gear R2 and the left output shaft SFL.

In the differential gear D configured as above, when the engine torque is transmitted to the ring gear RD via the transmission 4, the torque transmitted to the ring gear RD is distributed to the sun gear SD and the carrier CD via the second and first pinion gears PD2 and PD1 at a torque distribution ratio of 1:1. The torque distributed to the carrier CD is transmitted to the left front wheel WFL via the left output shaft SFL, and the torque distributed to the sun gear SD is transmitted to the right front wheel WFR via the right output shaft SFR.

As described above, in the power plant 41, the second ring gear R2 and the carrier CD are connected to each other via the third rotating shaft 18 and the flange 19, and the carrier CD is directly connected to the left output shaft SFL. Therefore, the rotational speeds of the second ring gear R2, the carrier CD, and the left output shaft SFL are equal to each other. Further, the first ring gear R1 is connected to the right output shaft SFR via the second rotating shaft 16 and the flange 17, and the sun gear SD of the differential gear D is connected to the right output shaft SFR via the rotating shaft and the flange 17. Therefore, the rotational speeds of the first ring gear R1, the sun gear SD, and the right output shaft SFR are equal to each other.

Further, the relationship between the rotational speeds of the carrier member 13 of the gear unit GS, the first rotor 11*b* of the first rotating electric machine 11, the first ring gear R1, the second ring gear R2, the sun gear S of the gear unit GS, and the second rotor 12*b* of the second rotating electric machine 12 is the same as in the first embodiment. Further, as is apparent from the fact that the differential gear D is a planetary gear unit of the double pinion type, the carrier CD, the ring gear RD, and the sun gear SD can be differentially rotated with each other, and they are in a collinear relationship in which the rotational speeds thereof are located on the same straight line in a collinear chart and are arranged from the left side in this order.

Figure 8:
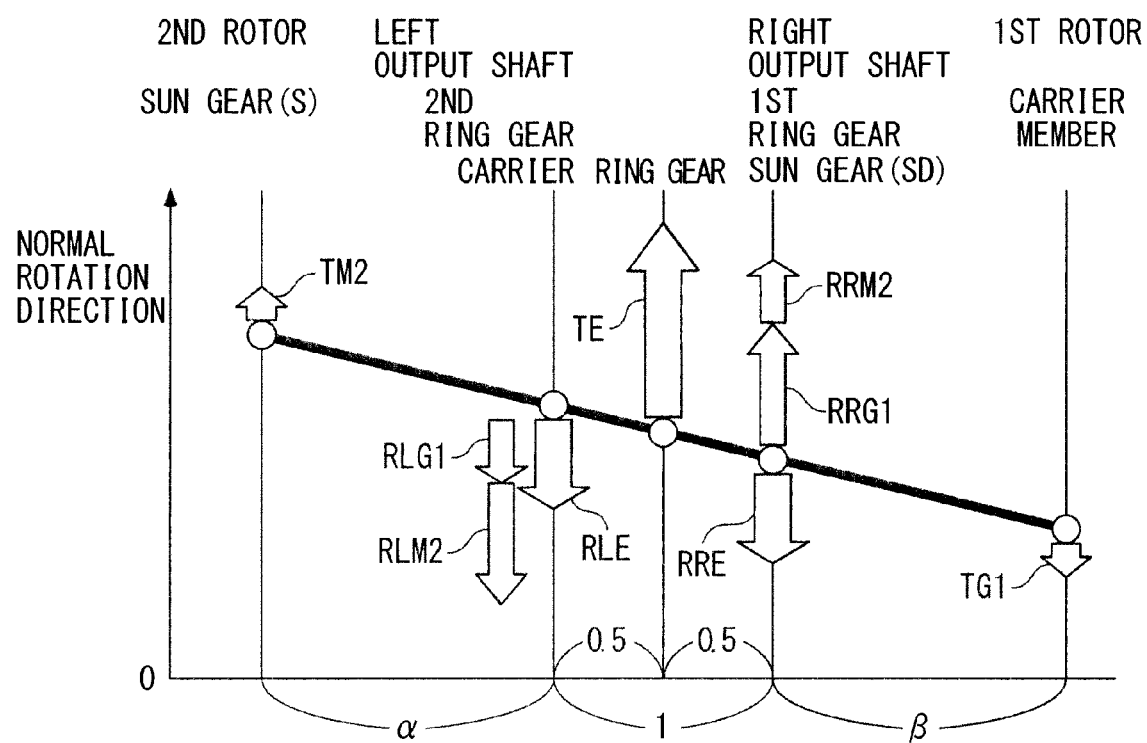
[FIG. 8] A collinear chart showing a rotational speed relationship and a torque balance relationship between various types of rotary elements of the power plant shown in FIG. 7, as to third yaw moment-increasing control for right turning.
Figure 9:
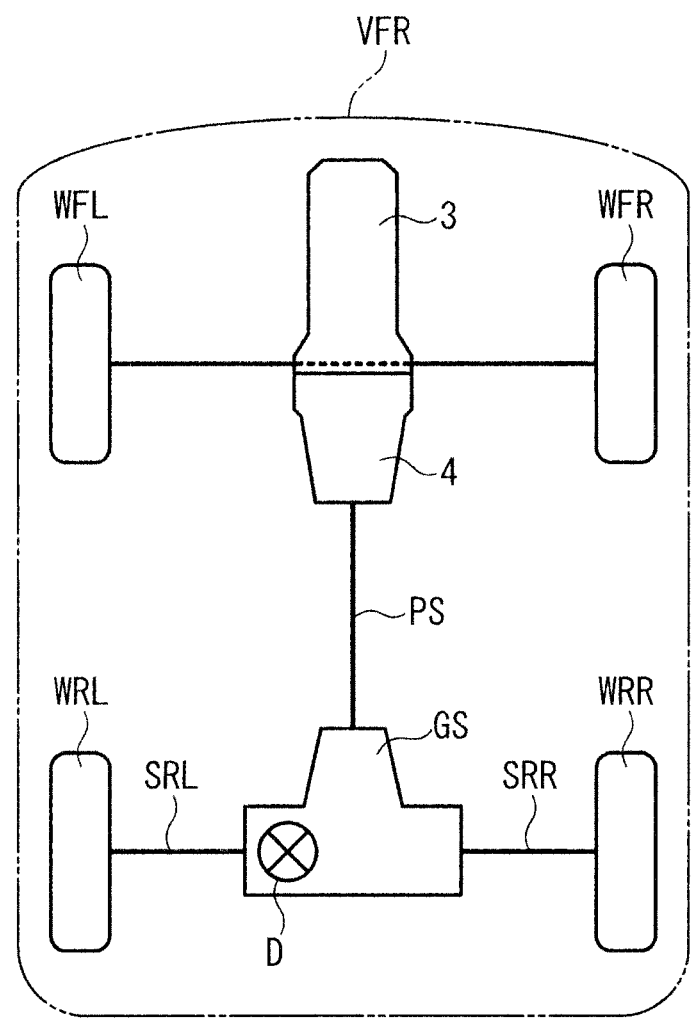
[FIG. 9] A diagram schematically showing an FR type vehicle to which a power plant according to a first variation of the second embodiment is applied.

From the above, the relationship between the rotational speeds of various rotary elements of the power plant 41 are represented e.g. in a collinear chart shown in FIG. 8. As shown in the figure, five rotary elements the rotational speeds of which are in a collinear relationship with each other are formed by the carrier CD, the ring gear RD, and the sun gear SD of the differential gear D, as well as the sun gear 5, the second ring gear R2, the first ring gear R1, and the carrier member 13 of the gear unit GS. Further, as is apparent from FIG. 8, the left and right output shafts SFL and SFR can be differentially rotated with each other. Note that in FIG. 8, in order to clearly show the sun gear S of the gear unit GS and the sun gear SD of the differential gear D, only reference numerals of the two S and SD are parenthesized.

Further, FIG. 8 shows a rotational speed relationship and a torque balance relationship between the various types of rotary elements in the third yaw moment-increasing control for right turning. In the figure, TE represents torque transmitted from the engine 3 to the ring gear RD via the transmission 4, and RLE and RRE represent reaction force torques which act on the left output shaft SFL and the right output shaft SFR along with transmission of torque from the engine 3 to the ring gear RD, respectively. The other parameters (the first motor braking torque TG1 etc.) are the same as in the first embodiment. As is apparent from the fact that the torque transmitted to the ring gear RD is distributed to the carrier CD and the sun gear SD at the torque distribution ratio of 1:1 as mentioned hereinabove, the reaction force torques RLE and RRE are equal to each other.

In this case, torque transmitted to the left output shaft SFL is represented by RLE+RLG1+RLM2, and torque transmitted to the right output shaft SFR is represented by RRE−(RRG1+RRM2). Thus, the torque transmitted to the left output shaft SFL becomes larger than the torque transmitted to the right output shaft SFR, whereby the right-turning yaw moment of the vehicle is increased.

As is apparent from a comparison between this FIG. 8 and FIG. 5 which shows the torque balance relationship etc. in the third yaw moment-increasing control for right turning, described in the first embodiment, an operation in the third yaw moment-increasing control is distinguished from the first embodiment only in that the torque of the engine 3 having the speed thereof changed by the transmission 4 is distributed to the left and right output shafts SFL and SFR by the differential gear D. The same applies to various operations performed during straight forward traveling and in the first yaw moment-increasing control, and hence description of the operation by the power unit 41 is omitted.

Further, the correspondence between various elements of the second embodiment and various elements of the present invention is as follows: The sun gear SD, the carrier CD, and the ring gear RD of the present embodiment correspond to a first rotary element, a second rotary element, and a third rotary element of the present invention, respectively, and the engine 3 of the present embodiment corresponds to an energy output device of the present invention. Further, the flange 17 of the present embodiment corresponds to a rotational energy transmission path between the first ring gear and one of the two rotating shafts of the present invention. The other correspondence is the same as in the first embodiment.

As described hereinabove, according to the second embodiment, the sun gear SD of the differential gear D is connected to the rotational energy transmission path between the first ring gear R1 of the gear unit GS and the right output shaft SFR, and the carrier CD is provided in the rotational energy transmission path between the second ring gear R2 of the gear unit GS and the left output shaft SFL. The ring gear RD of the differential gear D is connected to the engine 3. With the above, not only the first and second motor output torques TM1 and TM2 but also the torque of the engine 3 is transmitted to the left and right output shafts SFL and SFR, and hence it is possible to reduce torque required of the first and second rotating electric machines 11 and 12. This makes it possible to downsize the first and second rotating electric machines 11 and 12. In addition to this, it is possible to obtain the same advantageous effects as provided by the first embodiment.

[FIG. ] 9 shows a first variation of the second embodiment. This first variation is an example in which the power plant is applied to a vehicle VFR of an FR (front-engine rear-drive) type. In this vehicle VFR, the differential gear D, the gear unit GS, and the first and second rotating electric machines (none of which are shown) are arranged in a rear part of the vehicle VFR, and the above-described ring gear (not shown) of the differential gear D is connected to the transmission 4 via a propeller shaft PS. Further, the relationship of connections between the left and right output shafts SRL and SRR, the differential gear D, the gear unit GS, and the first and second rotating electric machines is distinguished from the second embodiment only in that the left and right output shafts SFL and SFR on the front side are replaced by the left and right output shafts SRL and SRR on the rear side, and the other of the relationship is the same as in the second embodiment.

Note that in this first variation, the vehicle VFR corresponds to a means of transport of the present invention.

With the above arrangement, the torque of the engine 3 is transmitted to the left and right output shafts SRL and SRR via the transmission 4, the propeller shaft PS, and the differential gear D, and is further transmitted to the left and right rear wheels WRL and WRR. Further, the first and second motor output torques and the first and second motor braking torques are transmitted to the left and right output shafts SRL and SRR via the gear unit GS and the differential gear D, and is further transmitted to the left and right rear wheels WRL and WRR. With the above, in this case as well, it is possible to obtain the same advantageous effects as provided by the second embodiment.

Figure 10:
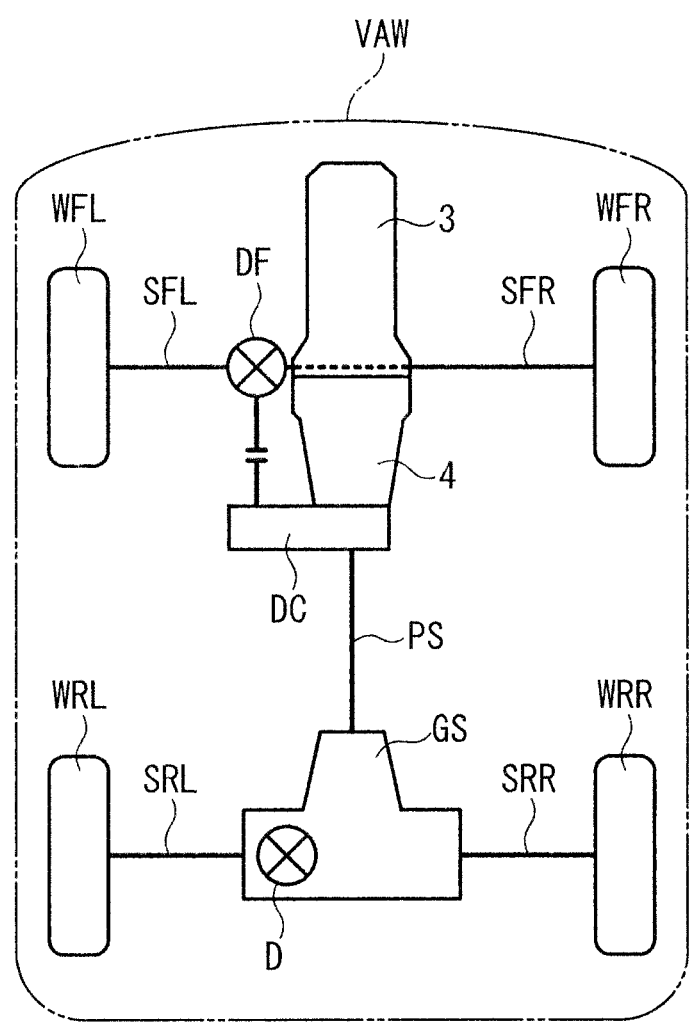
[FIG. 10] A diagram schematically showing an all-wheel drive vehicle to which a power plant according to a second variation of the second embodiment is applied.

Further, FIG. 10 shows a second variation of the second embodiment. This second variation is an example in which the power plant is applied to an all-wheel drive vehicle VAW.

In this vehicle VAW, the front-side left and right output shafts SEP and SFR are connected to the engine 3 via a front differential DF, a center differential DC, and the transmission 4. Further, the differential gear D, the gear unit GS, and the first and second rotating electric machines (none of which are shown) are arranged in a rear part of the vehicle VAW, and the ring gear (not shown) of the differential gear D is connected to the transmission 4 via the propeller shaft PS and the center differential DC. Further, the relationship of connections between the left and right output shafts SRL and SRR, the differential gear D, the gear unit GS, and the first and second rotating electric machines is the same as in the above-described first variation.

Note that in this second variation, the vehicle VAW corresponds to the means of transport of the present invention.

With the above arrangement, the torque of the engine 3 is transmitted to the center differential DC via the transmission 4, and is distributed to the front differential DF and the propeller shaft PS. The torque distributed to the front differential DF is transmitted to the left and right output shafts SFL and SFR, and is further transmitted to the left and right front wheels WFL and WFR. The torque distributed to the propeller shaft PS is transmitted to the left and right output shafts SRL and SRR via the differential gear D, and is further transmitted to the left and right rear wheels WRL and WRR. Further, the first and second motor output torques, and the first and second motor braking torques are transmitted to the left and right output shafts SRL and SRR via the gear unit GS and the differential gear D, and is further transmitted to the left and right rear wheels WRL and WRR. With the above, in this case as well, it is possible to obtain the same advantageous effects as provided by the second embodiment.

Note that although in the first and second variations of the second embodiment, the engine 3 and the transmission 4 are arranged in the front parts of the vehicles VFR and VAW, they may be arranged in the rear parts of the vehicles.

Figure 11:
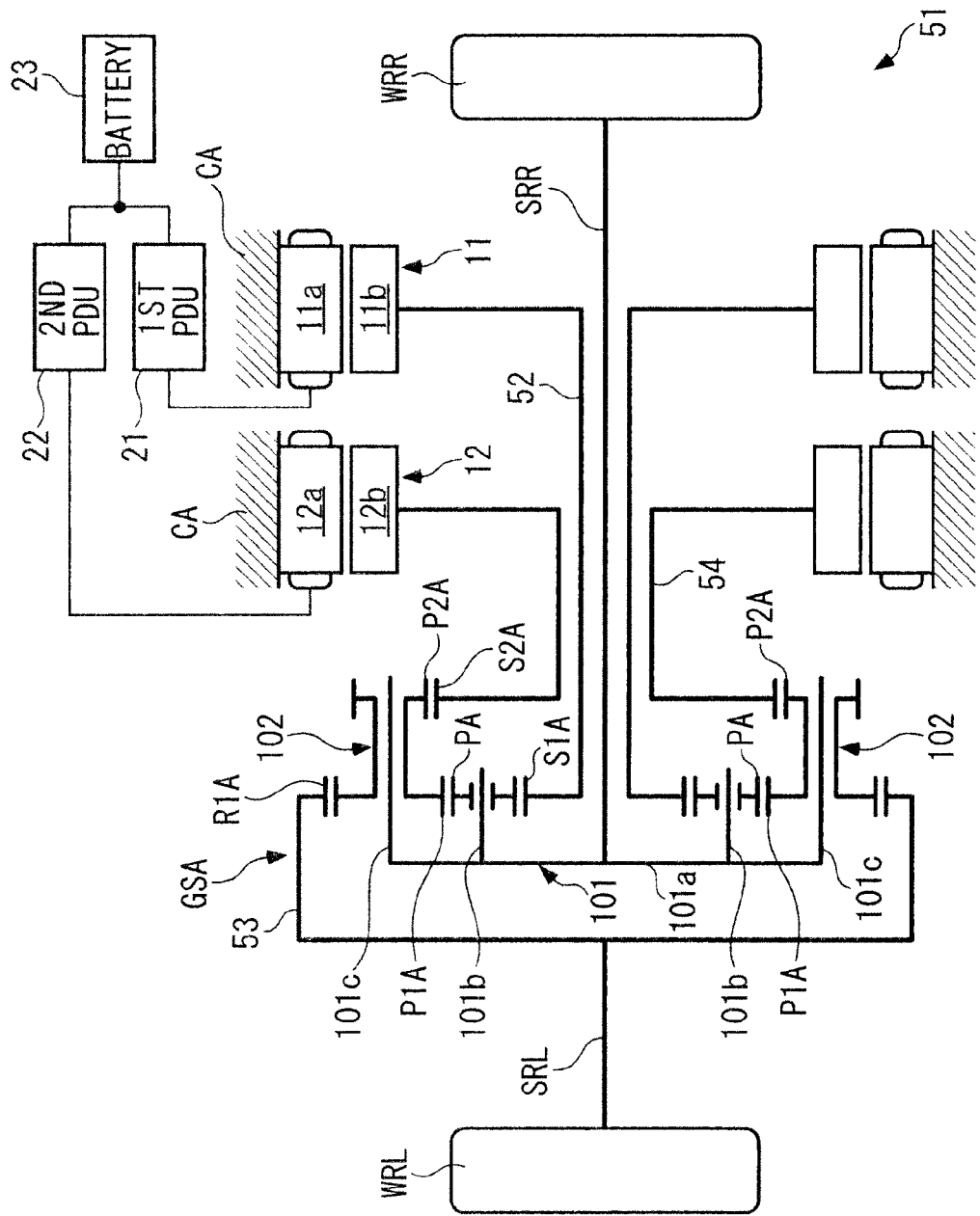
[FIG. 11] A diagram schematically showing a power plant according to a third embodiment of the present invention together with left and right rear wheels of a vehicle to which the power plant is applied.
Figure 12:
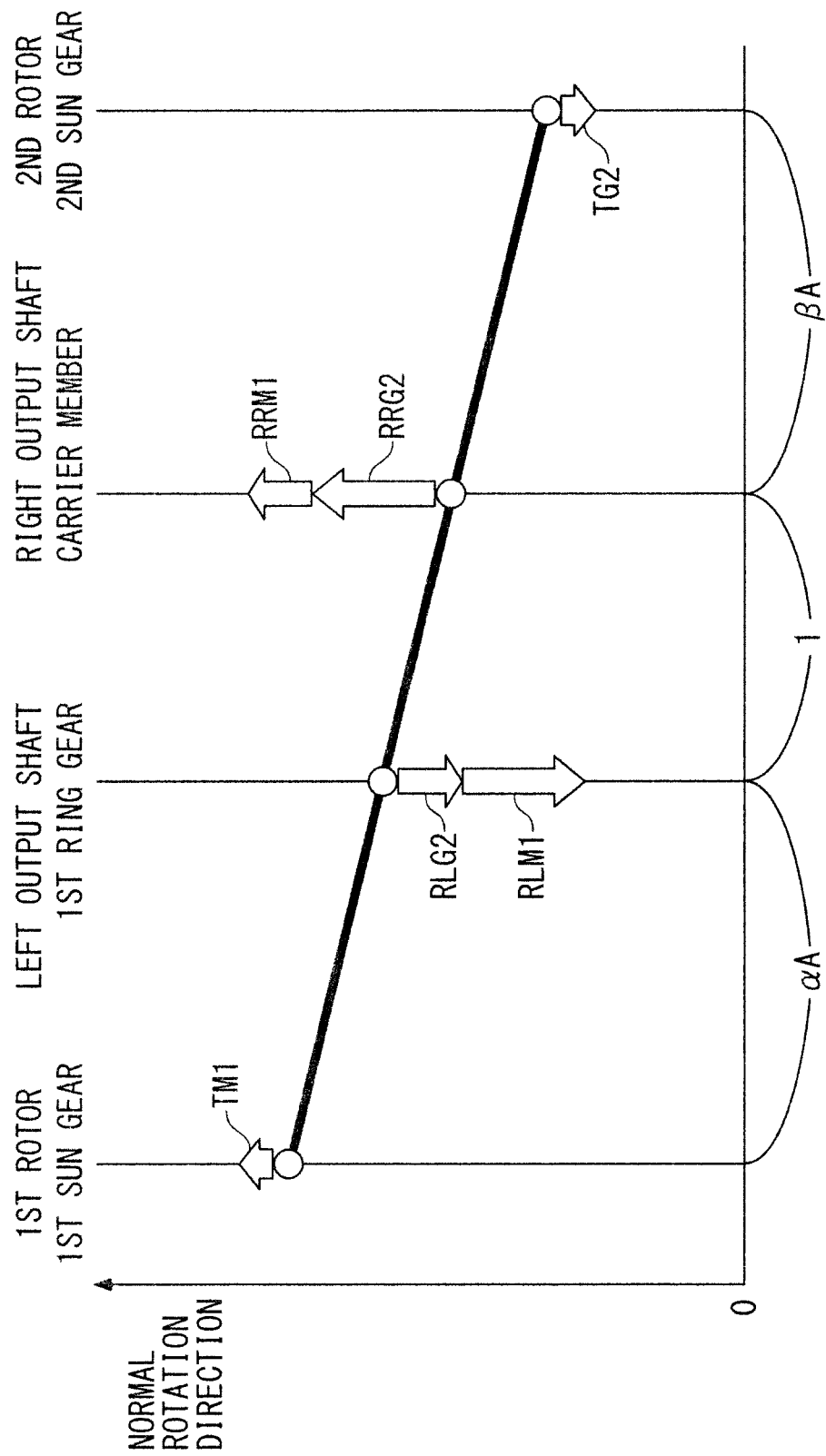
[FIG. 12] A collinear chart showing a rotational speed relationship and a torque balance relationship between various types of rotary elements of the power plant shown in FIG. 11, as to third yaw moment-increasing control for right turning.

Next, a power plant 51 according to a third embodiment of the present invention will be described with reference to FIGS. 11 and 12. This power plant 51 is distinguished from the first embodiment mainly in the construction of a gear unit GSA. In FIGS. 11 and 12, the same component elements as those of the first embodiment are denoted by the same reference numerals. The following description is mainly given of different points from the first embodiment.

Referring to FIG. 11, the gear unit GSA includes a carrier member 101, a first sun gear S1A, pinion gears PA, double pinion gears 102, a first ring gear R1A, and a second sun gear S2A. The gear unit GSA is disposed coaxially with the left and right output shafts SRL and SRR, and is located between the left and right rear wheels WRL and WRR.

The carrier member 101 is comprised of a disk-shaped root portion 101a, four first support shafts 101b (only two of which are shown) and four second support shafts 101c (only two of which are shown), which are integrally formed with the root portion 101a. Further, the carrier member 101 is rotatably supported by a bearing (not shown), and first and third rotating shafts 52 and 54, referred to hereinafter, are relatively rotatably disposed inward of the carrier member 101. The root portion 101a is coaxially integrally attached to the right output shaft SRR, whereby the carrier member 101 is rotatable in unison with the right output shaft. SRR.

The first support shafts 101b are arranged at respective locations in the radial center of the root portion 101a, and the second support shafts 101c are arranged at the radially outer end of the root portion 101a. The two 101b and 101c extend toward the right rear wheel WRP in the axial direction of the left and right output shafts SRL and SRR. Further, the four first support shafts 101b are located at equally-spaced intervals in a circumferential direction of the root portion 101a. The same applied to the four second support shafts 101c.

The above-mentioned double pinion gears 102 are each comprised of a first pinion gear P1A and a second pinion gear P2A integrally formed with each other. The number of the double pinion gears 102 is 4 (only two of which are shown) which is equal to the number of the above-mentioned second support shafts 101c, and each double pinion gear 102 is rotatably supported on an associated one of the second support shafts 101c via a bearing (not shown). Further, the first and second pinion gears P1A and P2A have pitch circle diameters different from each other. Note that the number of the double pinion gears 102 and the number of the second support shafts 101c are not limited to 4 but they can be set as desired.

Further, the first sun gear S1A, the pinion gears PA, the first pinion gears P1A of the double pinion gears 102, and the first ring gear R1A are radially arranged from inside in this order. The first sun gear S1A is connected to the first rotor 11b via the first rotating shaft 52 which is hollow cylindrical and rotatably supported by a bearing (not shown), and is rotatable in unison with the first rotor 11b. The right output shaft SRR and the third rotating shaft 54 are relatively rotatably disposed inside and outside the first rotating shaft 52, respectively.

The number of the pinion gears PA is 4 (only two of which are shown) which is equal to the number of the above-described first support shafts 101b of the carrier member 101. Each pinion gear PA is rotatably supported on an associated one of the first support shafts 101b via a bearing (not shown), and is in mesh with both the first sun gear S1A and an associated one of the first pinion gears P1A. Note that the number of the pinion gears PA and the number of the first support shafts 101b are not limited to 4 but they can be set as desired. The first ring gear R1A is connected to the left output shaft SRL via a second rotating shaft 53 which is hollow cylindrical and rotatably supported by a bearing (not shown) and a flange, and is rotatable in unison with the left output shaft SRL. The carrier member 101 is relatively rotatably disposed inside the second rotating shaft 53.

The above-mentioned second sun gear S2A and second pinion gears P2A of the double pinion gears 102 are radially arranged from inside in this order. A gear set of these gears is arranged between a gear set of the above-described first sun gear S1A, pinion gears PA, first pinion gears P1A, and first ring gear R1A, and the second rotating electric machine 12. The second sun gear S2A is connected to the second rotor 12b via the hollow cylindrical third rotating shaft 54 rotatably supported by a bearing (not shown), and is rotatable in unison with the second rotor 12b. The second pinion gears P2A are in mesh with the second sun gear S2A.

With the above arrangement, the first sun gear S1A, the first ring gear R1A, the carrier member 101, and the second sun gear S2A are capable of transmitting motive power therebetween, and the rotational speeds thereof are in a collinear relationship with each other. Further, when the first sun gear S1A is caused to rotate in a state in which the carrier member 101 is fixed, the first ring gear R1A rotates in the same direction as the direction of rotation of the first sun gear S1A, and the second sun gear S2A rotates in a direction opposite to the direction of rotation of the first sun gear S1A. In this case, from the relationship between the tooth numbers of the gears, the rotational speed of the first sun gear S1A becomes higher than that of the first ring gear R1A. From the above, in the collinear chart indicating the relationship between the rotational speeds, the first sun gear S1A, the first ring gear R1A, the carrier member 101, and the second sun gear S2A are depicted in this order.

Further, since the first sun gear S1A and the first rotor 11b are connected to each other via the first rotating shaft 52, the rotational speeds of the first sun gear S1A and the first rotor 11b are equal to each other. Further, since the first ring gear R1A is connected to the left output shaft SRL via the second rotating shaft 53 and the flange, the rotational speeds of the first ring gear R1A and the left output shaft SRL are equal to each other. Further, since the carrier member 101 is directly connected to the right output shaft SRR, the rotational speeds of the carrier member 101 and the right output shaft SRR are equal to each other. Furthermore, since the second sun gear S2A and the second rotor 12b are connected to each other via the third rotating shaft 54, the rotational speeds of the second sun gear S2A and the second rotor 12b are equal to each other.

From the above, a rotational speed relationship and a torque balance relationship between the various types of rotary elements of the power plant 51 according to the third embodiment are represented e.g. in a collinear chart shown in FIG. 12. Various parameters appearing in the figure are as described in the first embodiment. Further, as is apparent from FIG. 12, the left and right output shafts SRL and SRR can be differentially rotated with each other. Furthermore, as is apparent from a comparison between this FIG. 12 and FIG. 5 which shows the rotational speed relationship and the torque balance relationship between the various types of the rotary elements of rhe power plant 1 according to the first embodiment, the power plant 51 according to the third embodiment operates similarly to the power plant 1 according to the first embodiment.

Further, in FIG. 12, αA and βA represent a first lever ratio and a second lever ratio, respectively, and are expressed by the following equations (3) and (4):

$$\alpha A = (ZR1A - ZS1A)/ZS1A \quad (3)$$

$$\beta A = (ZR1A \times ZP2A)/(ZS2A \times ZP1A) \quad (4)$$

wherein ZR1A represents the tooth number of the first ring gear R1A, ZS1A represents the tooth number of the first sun gear S1A, ZP2A represents the tooth number of the second pinion gear P2A, ZS2A represents the tooth number of the second sun gear S2A, and ZP1A represents the tooth number of the first pinion gear P1A.

The tooth number ZR1A of the first ring gear R1A, the tooth number ZS1A of the first sun gear S1A, the tooth number ZP2A of the second pinion gear P2A, the tooth number ZS2A of the second sun gear S2A, and the tooth number ZP1A of the first pinion gear P1A are set such that the first and second lever ratios αA and βA take relatively large values on condition that one of the first and second rotors 11b and 12b does not perform reverse rotation within a range in which the left and right output shafts SRL and SRR can be differentially rotated with each other.

Further, the correspondence between various elements of the third embodiment and the various elements of the present invention is as follows: The right output shaft SRR and the left output shaft SRL of the present embodiment correspond to one and the other of the two rotating shafts of the present invention, respectively, and the first and second rotating electric machines 11 and 12 of the present embodiment correspond to the first and second energy input/output devices of the present invention, respectively. Further, the left and right rear wheels WRL and WRR of the present embodiment correspond to the two driven parts of the present invention.

As described above, according to the third embodiment, the double pinion gears 102 and the pinion gears PA are rotatably supported by the carrier member. 101, and the first pinion gears P1A of the double pinion gears 102 and the pinion gears PA are in mesh with the pinion gears PA and the first sun gear S1A, respectively. Further, the first and second pinion gears P1A and P2A of the double pinion gears 102 are in mesh with the first ring gear R1A and the second sun gear S2A, respectively. Furthermore, these first and second sun gears S1A and S2A are connected to the first and second rotating electric machines 11 and 12, respectively, and the carrier member 101 and the first ring gear R1A are connected to the right output shaft SRR and the left output shaft SRL, respectively.

From the above, it is possible to transmit the first and second motor output torques TM1 and TM2, and the first and second motor braking torques TG1 and TG2 to the left and right output shafts SRL and SRR via the first sun gear S1A, the second sun gear S2A, the first ring gear R1A, the carrier member 101, and so forth, and properly drive (brake) the output shafts SRL and SRR. In this case, as described above with reference to FIG. 12, the rotational speeds of the first sun gear S1A, the first ring gear R1A, the carrier member 101, and the second sun gear S2A are in the collinear relationship with each other, so that by controlling the first and second rotating electric machines 11 and 12, it is possible to properly control torque distributed to the left and right output shafts SRL and SRR, and in turn enhance traveling performance including the turnability of the vehicle.

Further, differently from the above-described conventional power plant, the first ring gear R1A is connected to the left output shaft SRL, and hence it is possible to set the tooth width of the first ring gear R1A to a relatively small value, whereby it is possible to downsize the power plant 51. Further, in the collinear chart (FIG. 12), the first and second sun gears S1A and S2A are located outside the first ring gear R1A and the carrier member 101, respectively, so that respective torques transmitted from the first and second rotating electric machines 11 and 12 to the first and second sun gears S1A and S2A, respectively, are transmitted to the left and right output shafts SRL and SRR in increased states. This makes it possible to set the tooth widths of the first and second sun gears S1A and S2A to relatively small values, which also makes it possible to downsize the power plant 51.

Furthermore, the first pinion gears P1A are in mesh with the first ring gear R1A, and hence as described above with reference to FIG. 20, the centrifugal force caused by rotation of the first pinion gears P1A and the engagement reaction force act on the bearing supporting the first pinion gear P1A such that they are offset by each other, so that compared with the above-described conventional case, it is possible to downsize the bearings, and in turn downsize the power plant 51.

Note that although in the third embodiment, the first ring gear. R1A is brought into mesh with the first pinion gears PIA, it may be brought into mesh with the second pinion gears P2A.

Figure 13:
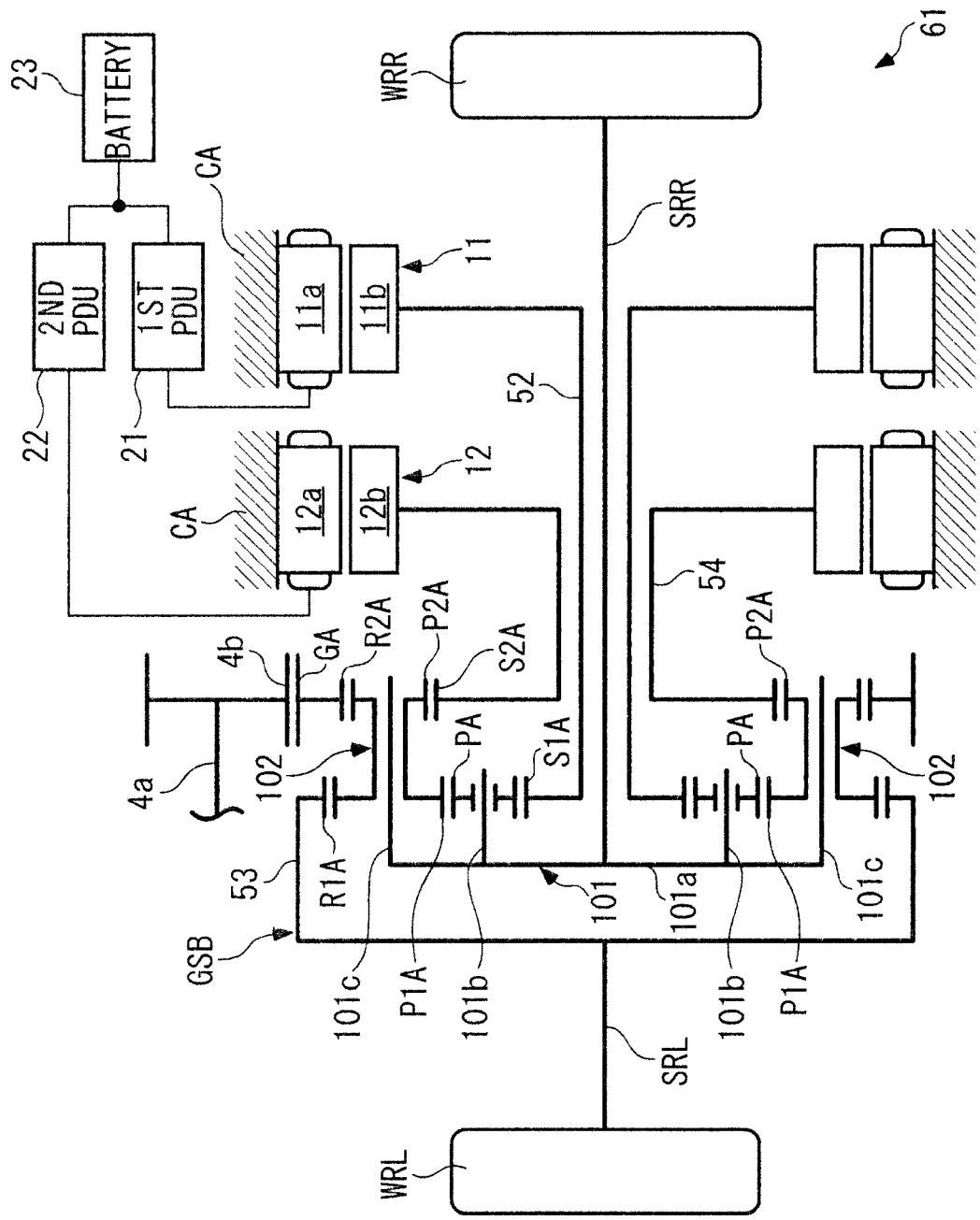
[FIG. 13] A diagram schematically showing a power plant according to a fourth embodiment of the present invention together with left and right rear wheels of a vehicle to which the power plant is applied.
Figure 14:
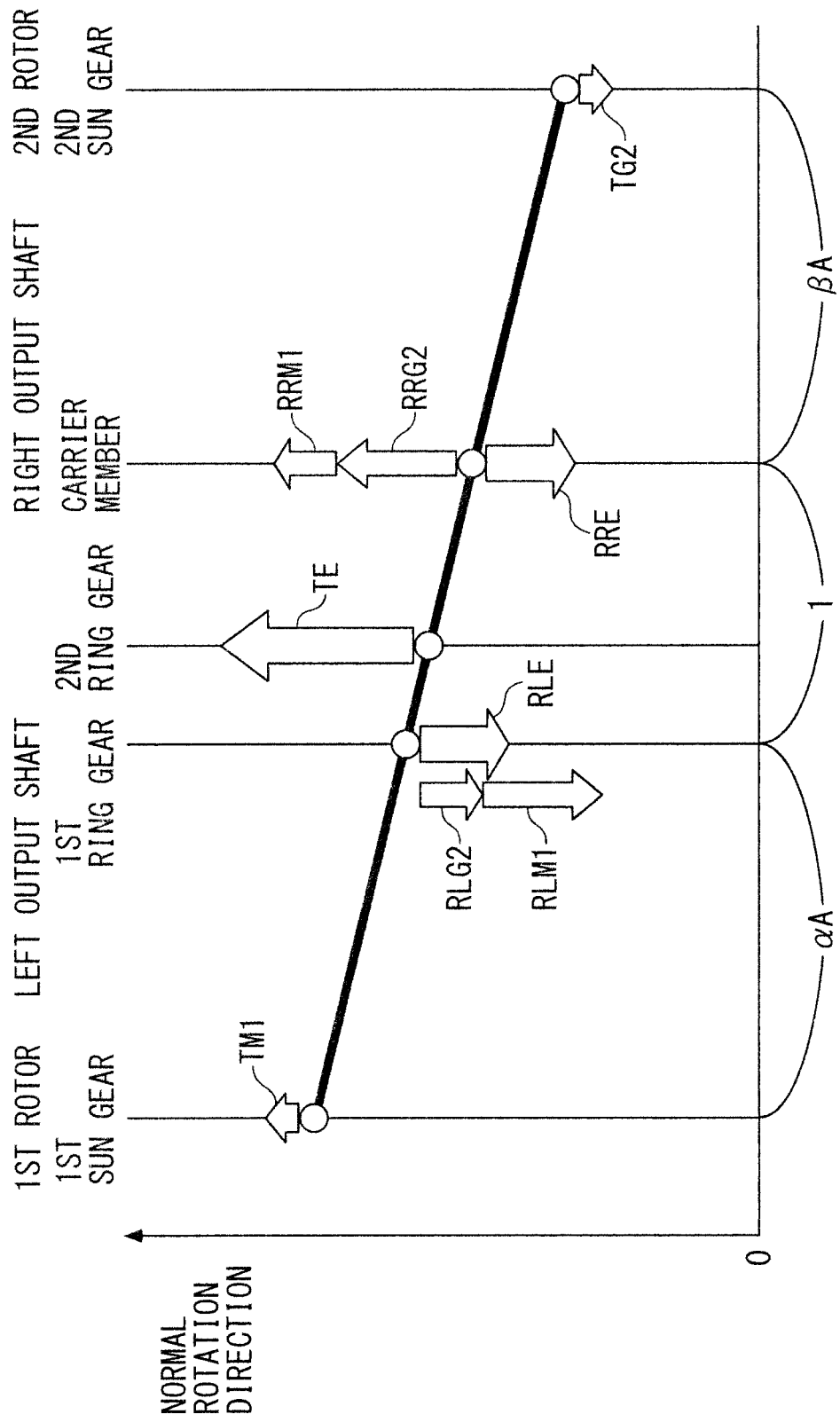
[FIG. 14] A collinear chart showing a rotational speed relationship and a torque balance relationship between various types of rotary elements of the power plant shown in FIG. 13, as to third yaw moment-increasing control for right turning.

Next, a power plant 61 according to a fourth embodiment of the present invention will be described with reference to FIGS. 13 and 14. This power plant 61 is distinguished from the third embodiment mainly in that the power plant 61 further includes a second ring gear R2A in mesh with the second pinion gears P2A, and the engine (not shown) as well as the transmission (not shown) described in the second embodiment. In FIGS. 13 and 14, the same component elements as those of the first to third embodiments are denoted by the same reference numerals. The following description is mainly given of different points from the first to third embodiments.

The second ring gear R2A of a gear unit GSB is disposed radially outward of the second pinion gears P2A, and has a gear GA formed around an outer periphery thereof. This gear GA is in mesh with the gear 4b attached to the output shaft 4a of the transmission. Further, a pitch circle diameter of the first ring gear R1A is set to a larger value than that of the second ring gear R2A, and a pitch circle diameter of the first pinion gear P1A is set to a larger value than that of the second pinion gear. P2A.

With the above arrangement, the first sun gear S1A, the first ring gear R1A, the second ring gear R2A, the carrier member 101, and the second sun gear S2A are capable of transmitting motive power therebetween, and the rotational speeds thereof are in a collinear relationship with each other. Further, when the first sun gear S1A is caused to rotate in the state in which the carrier member 101 is fixed, both the first and second ring gears R1A and R2A rotate in the same direction as the direction of rotation of the first sun gear S1A, and the second sun gear S2A rotates in the direction opposite to the direction of rotation of the first sun gear S1A.

In this case, from the relationship between the tooth numbers of the gears, the relationship of the rotational speed of the first sun gear S1A>the rotational speed of the first ring gear R1A>the rotational speed of the second ring gear R2A" holds between the rotational speeds of the first sun gear S1A, the first ring gear R1A, and the second ring gear R2A. From the above, in the collinear chart indicating the relationship between the rotational speeds, the first sun gear S1A, the first ring gear R1A, the second ring gear R2A, the carrier member 101, and the second sun gear S2A are depicted in this order.

Further, since the first sun gear S1A and the first rotor 11b are connected to each other via the first rotating shaft 52, the rotational speeds of the first sun gear S1A and the first rotor 11b are equal to each other. Furthermore, since the first ring gear R1A is connected to the left output shaft SRL via the second rotating shaft 53 and the flange, the rotational speeds of the first ring gear R1A and the left output shaft SRL are equal to each other. Further, since the carrier member 101 is directly connected to the right output shaft SRR, the rotational speeds of the carrier member 101 and the right output shaft SRR are equal to each other. Furthermore, since the second sun gear S2A and the second rotor 12b are connected to each other via the third rotating shaft 54, the rotational speeds of the second sun gear S2A and the second rotor 12b are equal to each other. Further, during operation of the engine, torque is transmitted from the engine to the second ring gear R2A via the transmission.

From the above, a rotational speed relationship and a torque balance relationship between the various types of rotary elements of the power plant 61 according to the fourth embodiment are represented e.g. in a collinear chart shown in FIG. 14. Various parameters appearing in the figure are as described in the first and second embodiments. Further, as is apparent from FIG. 14, the left and right output shafts SRL and SRR can be differentially rotated with each other. Furthermore, as is apparent from a comparison between this FIG. 14 and FIGS. 5 and 8 which show the rotational speed relationship and the torque balance relationship between the various types of rotary elements of the power plants 1 and 41 according to the first and second embodiments, the power plant 61 according to the fourth embodiment operates similarly to the power plants 1 and 41 according to the first and second embodiments.

Note that the order of appearance of the first and second ring gears R1A and R2A in the collinear chart shown in FIG. 14 is changed depending on the relationship between the tooth numbers thereof.

From the above, according to the fourth embodiment, it is possible to obtain the same advantageous effects as provided by the third embodiment. Further, as shown in FIG. 14, it is possible to form five rotary elements (the first sun gear S1A, the first ring gear R1A, the second ring gear R2A, the carrier member 101, and the second sun gear S2A) the rotational speeds of which are in a collinear relationship with each other. In this case, differently from the second embodiment, the five rotary elements can be formed by only the gear unit GSB without using the differential gear 2, so that it is possible to further downsize the power plant 61.

Further, centrifugal forces caused by rotation of the first and second pinion gears P1A and P2A and engagement reaction forces act on the bearings supporting the first and second pinion gears P1A and P2A, respectively, such that the centrifugal forces and the engagement reaction forces are offset by each other, respectively, so that compared with the above-described conventional case, it is possible to downsize the bearings, which also makes it possible to further downsize the power plant 61.

Furthermore, not only rotational energy from the first and second rotating electric machines 11 and 12 but also rotational energy from the engine is transmitted to the left and right output shafts SRL and SRR, and hence it is possible to reduce rotational energy required of the first and second rotating electric machines 11 and 12, which in turn makes it possible to downsize the first and second rotating electric machines 11 and 12.

Note that although in the fourth embodiment, the first ring gear R1A is brought into mesh with the first pinion gears P1A, and the second ring gear R2A is brought into mesh with the second pinion gears P2A, inversely, the first ring gear R1A may be brought into mesh with the second pinion gears P2A, and the second ring gear R2A may be brought into mesh with the first pinion gears P1A.

Figure 15:
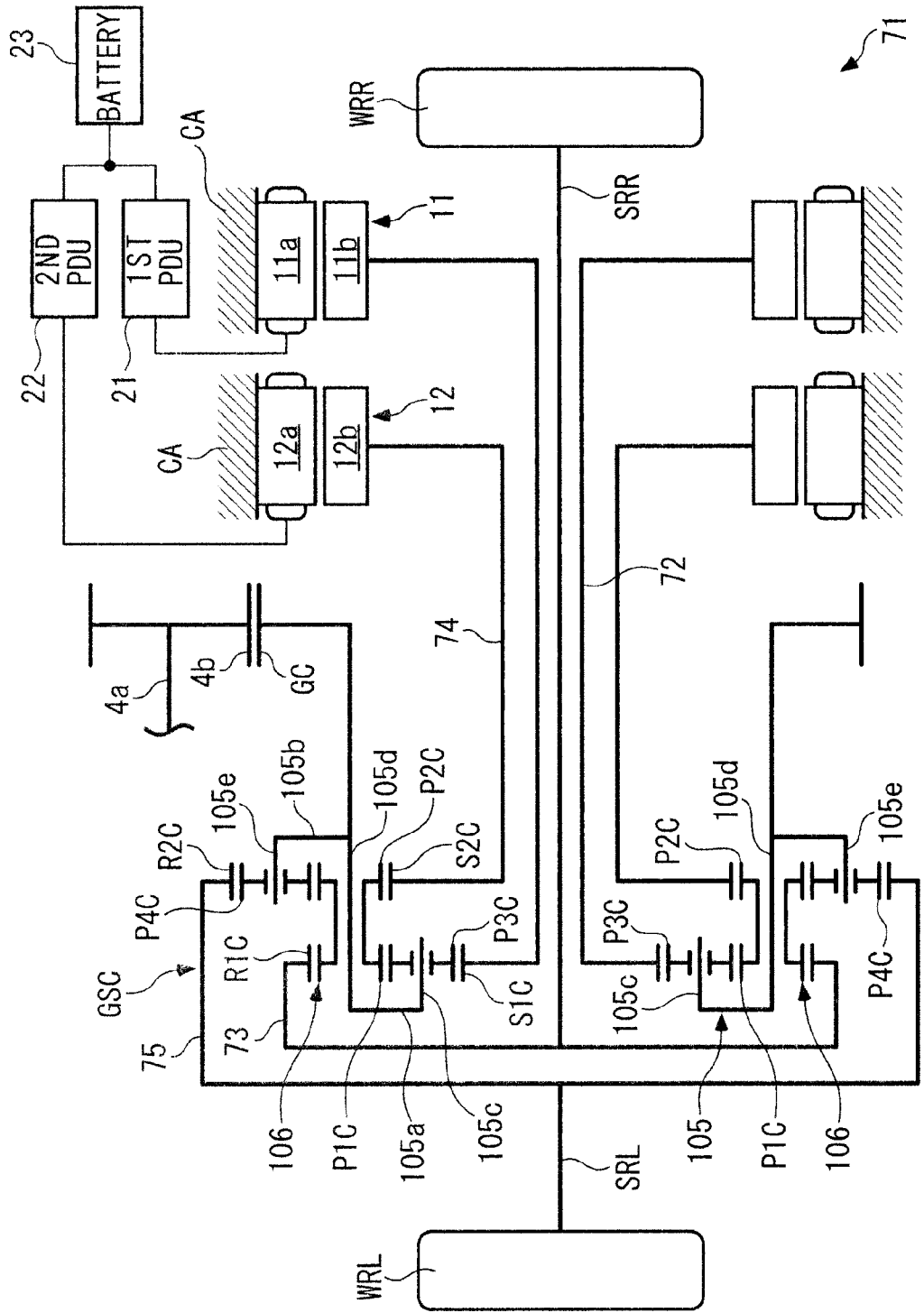
[FIG. 15] A diagram schematically showing a power plant according to a fifth embodiment of the present invention together with left and right rear wheels of a vehicle to which the power plant is applied.
Figure 16:
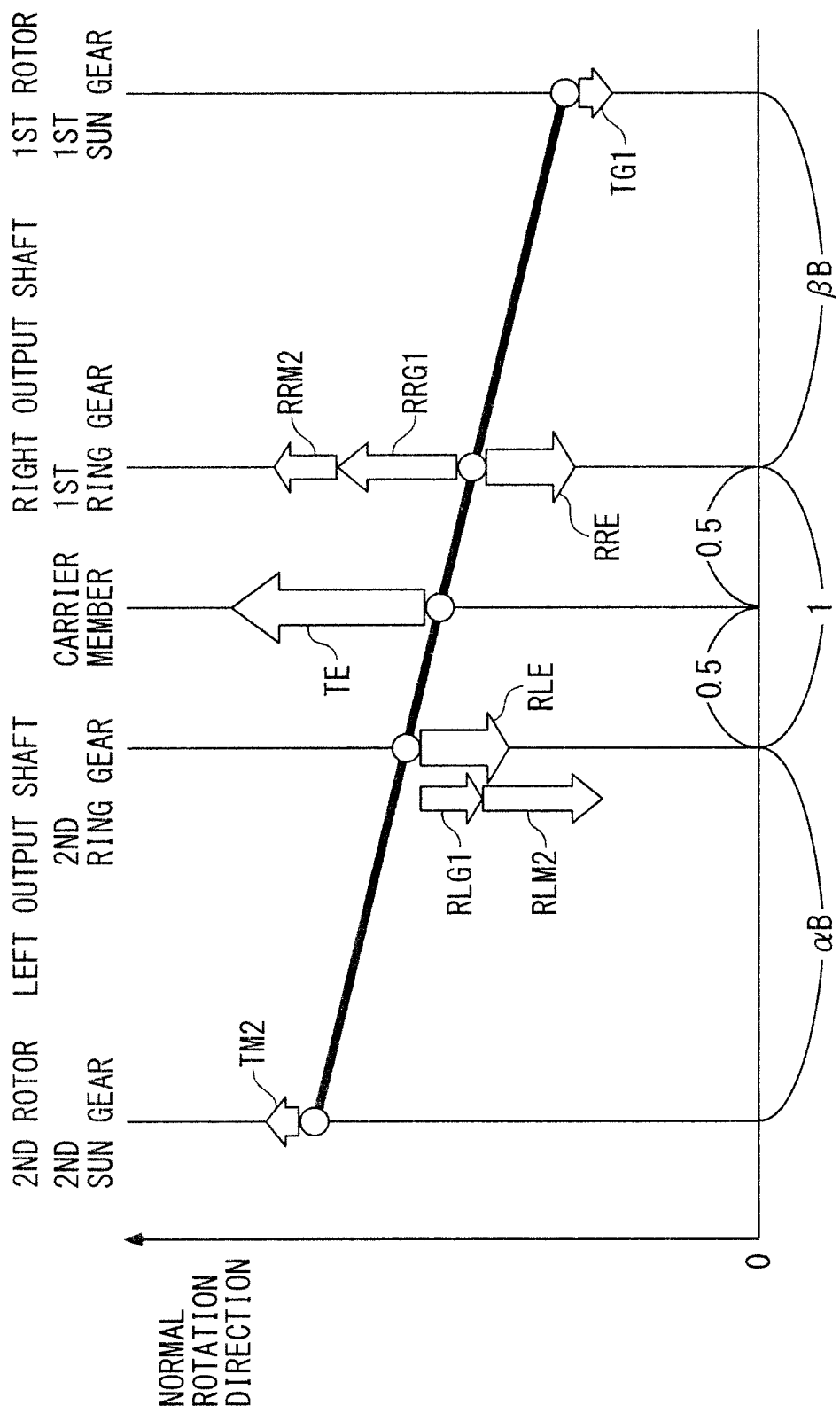
[FIG. 16] A collinear chart showing a rotational speed relationship and a torque balance relationship between various types of rotary elements of the power plant shown in FIG. 15, as to third yaw moment-increasing control for right turning.

Next, a power plant 71 according to a fifth embodiment of the present invention will be described with reference to FIGS. 15 and 16. This power plant 71 is distinguished from the first embodiment mainly in the construction of a gear unit GSC and in that the power plant 71 further includes the engine (not shown) and the transmission (not shown) described in the second embodiment. In FIGS. 15 and 16, the same component elements as those of the first and second embodiments are denoted by the same reference numerals. The following description is mainly given of different points from the first to fourth embodiments.

Referring to FIG. 15, the gear unit GSC includes a carrier member 105, double pinion gears 106, a first sun gear S1C, third pinion gears P3C, a first ring gear R1C, a second sun gear S2C, fourth pinion gears P4C, and a second ring gear R2C. The gear unit GSC is disposed coaxially with the left and right output shafts SRL and SRR, and is located between the left and right rear wheels WRL and WRR.

The carrier member 105 is comprised of a first root portion 105a and a second root portion 105b each having an annular plate shape, four first support shafts 105c (only two of which are shown), four second support shafts 105d (only two of which are shown), and four third support shafts 105e (only two of which are shown), which are integrally formed with the two root portions 105a and 105b. Further, the carrier member 105 is rotatably supported by a bearing (not shown), and first and third rotating shafts 72 and 74, referred to hereinafter, are relatively rotatably disposed inward of the carrier member 105.

The first and second root portions 105a and 105b are arranged coaxially with the left and right output shafts SRL and SRR. The second root portion 105b is disposed at a radially outer location and also closer to the right rear wheels WRR than the first root portion 105a, and is integrally attached to one end of a rotating shaft which is hollow cylindrical. A gear GC is integrally attached to the other end of this rotating shaft. This gear GC is in mesh with the gear 4b of the output shaft 4a of the transmission. Further, a third rotating shaft 74 is relatively rotatably disposed inside the rotating shaft.

The first to third support shafts 105c to 105e are radially arranged from inside in this order. The first support shafts 105c are attached to a radially inner end of the first root portion 105a, and extend toward the right rear wheels WRR in the axial direction of the left and right output shafts SRL and SRR. The second support shafts 105d are provided between the first and second root portions 105a and 105b, and extend in the axial direction of the left and right output shafts SRL and SRR. The third support shafts 105e are attached to a radially outer end of the second root portion 105b, and extend in the axial direction of the left and right output shafts SRL and SRR, toward the left rear wheels WRL, i.e. toward a side opposite to the first support shafts 105c.

The double pinion gears 106 are each comprised of a first pinion gear P1C and a second pinion gear P2C integrally formed with each other. The number of the double pinion gears 106 is 4 (only two of which are shown) which is equal to the number of the above-mentioned first support shafts 105d, and each double pinion gear 106 is rotatably supported on an associated one of the second support shafts 105d via a bearing (not shown). Further, the first and second pinion gears P1C and P2C have pitch circle diameters different from each other. Note that the number of the double pinion gears 106 and the number of the second support shafts 105d are not limited to 4 but they can be set as desired.

Further, the first sun gear S1C, the third pinion gears P3C, the first pinion gears P1C of the double pinion gears 106, and the first ring gear Rio are radially arranged from inside in this order. The first sun gear S1C is connected to the first rotor 11b via a first rotating shaft 72 which is hollow cylindrical and rotatably supported by a bearing (not shown), and is rotatable in unison with the first rotor 11b. The right output shaft SRR and the third rotating shaft 74 are relatively rotatably disposed inside and outside the first rotating shaft 72, respectively.

Further, the number of the third pinion gears P30 is 4 (only two of which are shown) which is equal to the number of the above-described first support shafts 105c of the carrier member 105. Each third pinion gear P3C is rotatably supported on an associated one of the first support shafts 105c via a bearing (not shown), and is in mesh with both the first sun gear SIC and an associated one of the first pinion gears P1C. Note that the numbers of the third pinion gears P3C and the first support shafts 105c are not limited to 4 but they can be set as desired. The first ring gear R1C is connected to the right output shaft SRR via a second rotating shaft 73 which is hollow cylindrical and rotatably supported by a bearing (not shown) and a flange, and is rotatable in unison with the right output shaft SRR. Further, the carrier member 105, and a fourth rotating shaft 75, referred to hereinafter, are relatively rotatably disposed inside and outside the second rotating shaft 73, respectively.

The above-mentioned second sun gear S2C, second pinion gears P2C of the double pinion gears 106, fourth pinion gears P4C, and second ring gear R2C are radially arranged from inside in this order. A gear set of these gears is arranged between a gear set of the above-described first sun gear S1C, third pinion gears P3C, first pinion gears P1C, and first ring gear R1C, and the second rotating electric machine 12. The second sun gear S20 is connected to the second rotor 12b via the third rotating shaft 74 which is hollow cylindrical and rotatably supported by a bearing (not shown), and is rotatable in unison with the second rotor 12b. The second pinion gears P2C of the double pinion gears 106 are in mesh with both the second sun gear S2C and the fourth pinion gears P4C.

Further, the number of the fourth pinion gears P4C is 4 (only two of which are shown) which is equal to the number of the above-described third support shafts 105e of the carrier member 105. Each fourth pinion gear P4C is rotatably supported on an associated one of the third support shafts 105e via a bearing (not shown), and is in mesh with both an associated one of the second pinion gears P2C and the second ring gear R2C. Note that the numbers of the fourth pinion gears P4C and the third support shafts 105e are not limited to 4 but they can be set as desired. The second ring gear R2C is connected to the left output shaft SRL via the hollow cylindrical fourth rotating shaft 75 rotatably supported by a bearing (riot shown) and a flange, and is rotatable in unison with the left output shaft SRL.

With the above arrangement, the first sun gear S1C, the first ring gear R1C, the carrier member 105, the second ring gear R2C, and the second sun gear S2C are capable of transmitting motive power therebetween, and the rotational speeds thereof are in a collinear relationship with each other. Further, when the first sun gear SIC is caused to rotate in a state in which the carrier member 105 is fixed, the first ring gear R1C rotates in the same direction as the direction of rotation of the first sun gear S1C, and the second sun gear S2C and the second ring gear R2C rotate in a direction opposite to the direction of rotation of the first sun gear SIC. In this case, from the relationship between the tooth numbers of the gears, the rotational speed of the first sun gear S1C becomes higher than that of the first ring gear R1C, and the rotational speed of the second sun gear S2C becomes lower than that of the second ring gear R2C. From the above, in the collinear chart indicating the relationship between the rotational speeds, the first sun gear SIC, the first ring gear R1C, the carrier member 105, the second ring gear R2C, and the second sun gear S2C are depicted in this order.

Further, since the first sun gear S1C and the first rotor 11b are connected to each other via the first rotating shaft 72, the rotational speeds of the first sun gear S1C and the first rotor 11b are equal to each other. Furthermore, since the first ring gear R1C is connected to the right output shaft SRR via the second rotating shaft 73 and the flange, the rotational speeds of the first ring gear R1C and the right output shaft SRR are equal to each other. Further, since the second ring gear R2C is connected to the left output shaft SRL via the fourth rotating shaft 75 and the flange, the rotational speeds of the second ring gear R2C and the left output shaft SRL are equal to each other. Further, since the second sun gear S2C and the second rotor 12b are connected to each other via the third rotating shaft 74, the rotational speeds of the second sun gear S2C and the second rotor 12b are equal to each other. Furthermore, during operation of the engine, torque is transmitted from the engine to the carrier member 105 via the transmission.

From the above, a rotational speed relationship and a torque balance relationship between the various types of rotary elements of the power plant 71 according to the fifth embodiment are represented e.g. in a collinear chart shown in FIG. 16. Various parameters appearing in the figure are as described in the first and second embodiments, except for αB and βB. Further, as is apparent from FIG. 16, the left and right output shafts SRL and SRR can be differentially rotated with each other. Furthermore, as is apparent from a comparison between this FIG. 16 and FIGS. 5 and 8 which show the rotational speed relationship and the torque balance relationship between the various types of the rotary elements of the power plants 1 and 41 according to the first and second embodiments, the power plant 71 operates similarly to the power plants 1 and 41 according to the first and second embodiments.

In FIG. 16, αB and βB represent a first lever ratio and a second lever ratio which are expressed, respectively, by the following equations (5) and (6)

$$\alpha B = \{(ZR2C-ZS2C)/(ZS2C \times ZR2C \times ZP1C)\} \times \{(ZR1C \times ZR2C \times ZP1C \times ZP2C)/(ZR1C \times ZP2C + ZR2C \times ZP1C)\} \quad (5)$$

$$\beta B = \{(ZR1C-ZS1C)/(ZS1C \times ZR1C \times ZP2C)\} \times \{(ZR1C - ZR2C \times ZP1C \times ZP2C)/(ZR1C \times ZP2C + ZR2C \times ZP1C)\} \quad (6)$$

wherein ZR2C represents the tooth number of the second ring gear R2C, ZS2C represents the tooth number of the second sun gear S2C, and ZP1C represents the tooth number of the first pinion gear P1C. Further, ZR1C represents the tooth number of the first ring gear R1C, ZP2C represents the tooth number of the second pinion gear P2C, and ZS1C represents the tooth number of the first sun gear S1C.

The tooth number ZR2C of the second ring gear R2C, the tooth number ZS2C of the second sun gear S2C, the tooth number ZP1C of the first pinion gear P1C, the tooth number ZR1C of the first ring gear R1C, the tooth number ZP2C of the second pinion gear P2C, and the tooth number ZS1C of the first sun gear S1C are set such that the first and second lever ratios αB and βB take relatively large values on condition that one of the first and second rotors 11b and 12b does not perform reverse rotation within a range in which the left and right rear wheels WRL and WRR can be differentially rotated with each other.

Further, in the collinear chart (FIG. 16), the distance from the carrier member 105 to the first ring gear R1C and the distance from the carrier member 105 to the second ring gear R2C are equal to each other, and the torque distribution ratio at which torque is distributed from the carrier member 105 to the left and right output shafts SRL and SRR is 1:1. For this reason, between the tooth numbers ZR1C and ZR2C of the first and second ring gears R1C and R2C, and the tooth numbers ZP1C and ZP2C of the first and second pinion gears P1C and P2C, there holds the following equation (7):

$$1/(ZR2C \times ZP1C) = 1/(ZR1C \times ZP2C) \quad (7)$$

Further, the tooth numbers ZR1C and ZR2C of the first and second ring gears R1C and R2C are set to the same value, the tooth numbers ZS1C and ZS2C of the first and second sun gears SiC and S2C are set to the same value, the tooth numbers ZP1C and ZP2C of the first and second pinion gears P1C and P2C are set to the same value, and the tooth numbers ZP3C and ZP4C of the third and fourth pinion gears P3C and P4C are set to the same value. As a consequence, as is apparent from the aforementioned equations (5) and (6), the first and second lever ratios αB and βB are set to the same value. Further, the diameters of the first and second pinion gears P1C and P2C are set to the same value.

Further, the correspondence between various elements of the fifth embodiment and the various elements of the present invention is as follows: The right output shaft SRR and the left output shaft SRL of the present embodiment correspond to one and the other of the two rotating shafts of the present invention, respectively, and the first and second rotating electric machines 11 and 12 of the present embodiment correspond to the first and second energy input/output devices of the present invention, respectively. Further, the left and right rear wheels WRL and WRR of the present embodiment correspond to the two driven parts of the present invention.

As described above, according to the fifth embodiment, the double pinion gears 106 and the third and fourth pinion gears P3C and P4C are rotatably supported by the carrier member 105, and the first and second pinion gears P1C and P2C of the double pinion gears 106 are in mesh with the third and fourth pinion gears P3C and P4C, respectively. Further, the third pinion gears P3C and the first pinion gears P1C are in mesh with the first sun gear S1C and the first ring gear R1C, respectively, and the second pinion gears P2C and the fourth pinion gears P4C are in mesh with the second sun gear S2C and the second ring gear R2C, respectively.

Furthermore, the first and second sun gears S1C and S2C are connected to the first and second rotating electric machines 11 and 12, respectively, and the first and second ring gears R1 and R2 are connected to the right output shaft SRR and the left output shaft SRl, respectively. With the above, it is possible to transmit the first and second motor output torques TM1 and TM2 and the first and second motor braking torques TG1 and TG2 to the right output shaft SRR and the left output shaft SRL via the first and second sun gears SiC and S2C, the first and second ring gears R1C and R2C, and so forth, and properly drive (brake) the two output shafts SRL and SRR.

In this case, as described above with reference to FIG. 16, the rotational speeds of the first sun gear S1C, the first ring gear R1C, the carrier member 105, the second ring gear R2C, and the second sun gear S2C are in the collinear relationship with each other, so that by controlling the first and second rotating electric machines 11 and 12, it is possible to properly control torque distributed to the left and right output shafts SRI and SRR, and in turn enhance traveling performance including the turnability of the vehicle.

Further, differently from the above-described conventional power plant, the first and second ring gears R1C and R2C are connected to the right output shaft. SRR and the left output shaft SRL, respectively, and hence similarly to the first embodiment, it is possible to set the tooth widths of the gears R1C and R2C to relatively small values, whereby it is possible to downsize the power plant 71.

Further, in the collinear chart (FIG. 16), the first and second sun gears SIC and S2C are located outside the first and second ring gears R1C and R2C, respectively, so that respective torques transmitted from the first and second rotating electric machines 11 and 12 to the first and second sun gears S1C and S2C are transmitted to the left and right output shafts SRL and SRR in increased states. This makes it possible to set the tooth widths of the first and second sun gears S1C and S2C to relatively small values, which also makes it possible to downsize the power plant 71.

Furthermore, the first and fourth pinion gears P1C and P4C are in mesh with the first and second ring gears R1C and R2C, and hence centrifugal forces caused by rotation of the first and fourth pinion gears P1C and P4C, and engagement reaction forces act on the bearings supporting the first and fourth pinion gears P1C and P4C such that the centrifugal forces and the engagement reaction forces are offset by each other, respectively, so that compared with the above-described conventional case, it is possible to downsize the bearings.

Further, similarly to the fourth embodiment, as shown in FIG. 16, it is possible to form five rotary elements (the first sun gear S1C, the first ring gear R1C, the carrier member 105, the second ring gear R2C, and the second sun gear S2C) the rotational speeds of which are in a collinear relationship with each other. In this case, differently from the second embodiment, the five rotary elements can be formed by only the gear unit GSC without using the differential gear D, so that it is possible to further downsize the power plant 71.

Furthermore, not only rotational energy from the first and second rotating electric machines 11 and 12 but also rotational energy from the engine is transmitted to the left and right output shafts SRL and SRR, and hence it is possible to reduce rotational energy required of the first and second rotating electric machines 11 and 12, which in turn makes it possible to downsize the first and second rotating electric machines 11 and 12.

Further, the first pinion gear P1C and the second pinion gear P2C are the same in the diameter and in the tooth numbers ZP1C and ZP2C. With this configuration, for example, when both the first and second pinion gears P1C and P2C are formed by spur gears, both the gears can be machined by the same cutter, and when they are formed by helical gears, they can be machined by respective cutters which are different only in the direction of torsion but are the same in specifications. Therefore, the first and second pinion gears P1C and P2C are excellent in productivity.

Note that although in the gear unit GSC, the first and second pinion gears P1C and P2C are formed as distinct gears integrally formed with each other, they may be formed by a single pinion gear which is relatively long in the axial direction. In this case, it is possible to further improve productivity.

FIGS. 21 to 24 show a variation of the gear unit GSC according to the fifth embodiment. The following description is mainly given of different points of the variation from the fifth embodiment, by referring to the left side and the right side, as viewed in FIG. 21, as "left" and "right". In the variation, the diameters and the tooth numbers of first and second sun gears Sic and S2c are set to the same values, respectively, the diameters and the tooth numbers of first and second ring gears R1c and R2c are set to the same values, respectively, the diameters and the tooth numbers of first and second pinion gears P1c and P2c of a double pinion gear 301 are set to the same values, respectively, and the diameters and the tooth numbers of third and fourth pinion gears P3c and P4c are set to the same values, respectively. Further, the diameters of the first and second pinion gears P1c and P2c are larger than the diameters of the third and fourth pinion gears P3c and P4c.

Figure 21:
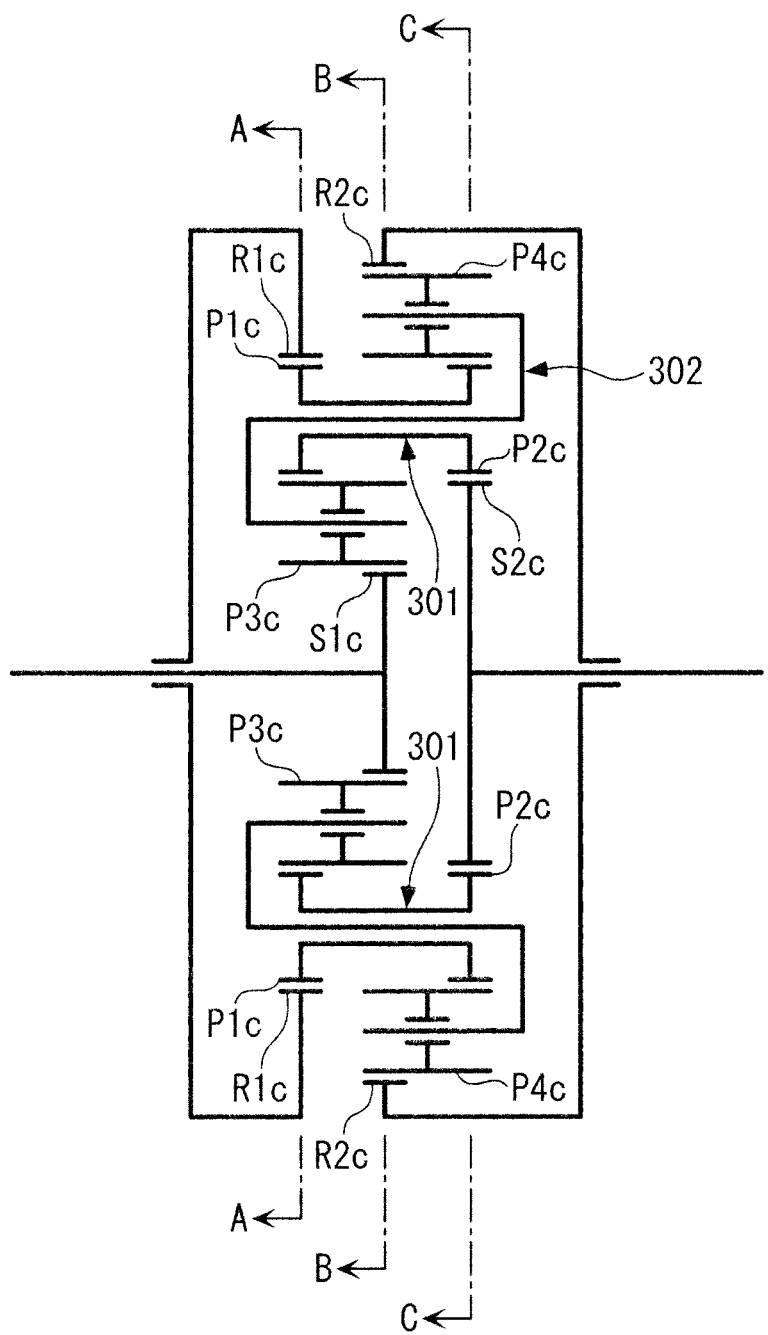
[FIG. 21] A diagram schematically showing a variation of a gear unit according to the fifth embodiment.

Note that in FIG. 21, the diameters of the first and second sun gears S1c and S2c, and the diameters of the first and second ring gears R1c and R2c are illustrated in different sizes from each other, respectively, for convenience of illustration. Further, in FIGS. 22 to 24, only cut surfaces of gear portions are illustrated, but illustrations of cut surfaces of shaft portions are omitted, for convenience.

As shown in FIGS. 21 to 24, similarly to the fifth embodiment, the first sun gear Sic is in mesh with the third pinion gears P3c, and the first pinion gears P1c are in mesh with both the third pinion gears P3c and the first ring gear R1c. Further, the second sun gear S2c is in mesh with the second pinion gears P2c, and the fourth pinion gears P4c are in mesh with both the second pinion gears P2c and the second ring gear R2c.

Figure 22:
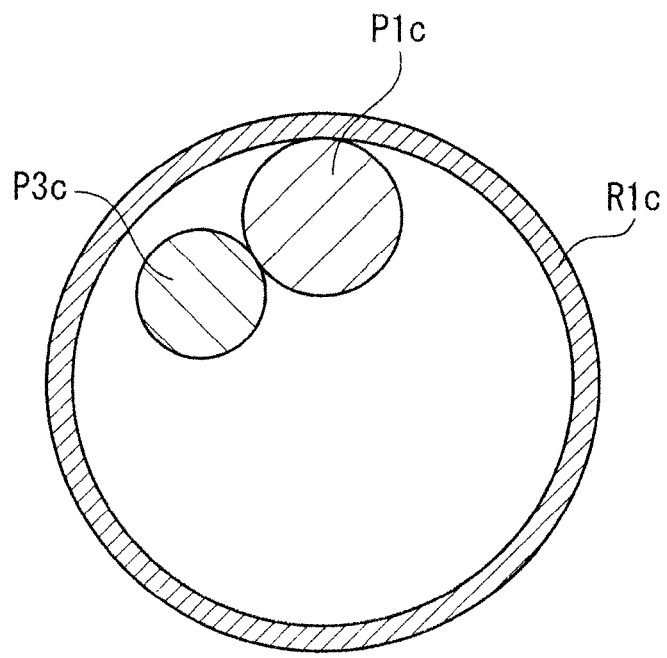
[FIG. 22] An end view of a section taken along line A-A of FIG. 21.
Figure 23:
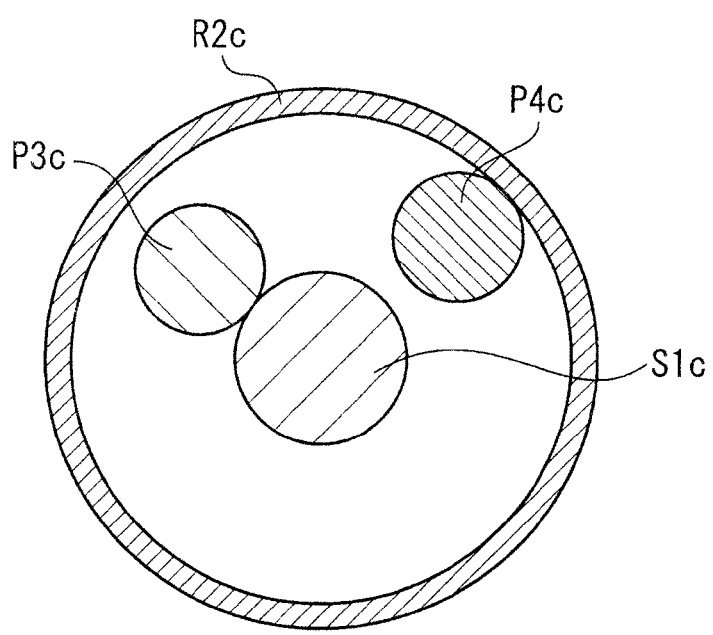
[FIG. 23] An end view of a section taken along line B-B of FIG. 21.
Figure 24:
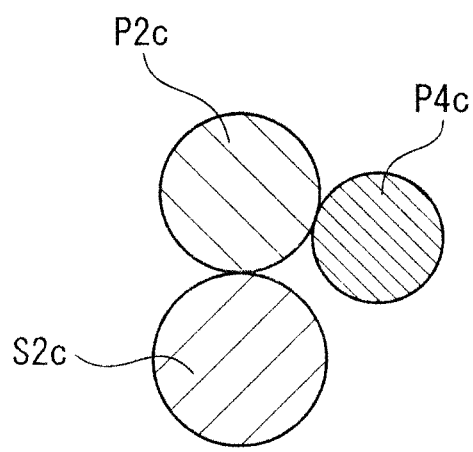
[FIG. 24] An end view of a section taken along line C-C of FIG. 21.

Further, the respective numbers of the first to fourth pinion gears P1c to P4c are 3 (only two of which are shown in FIG. 21, and only one of which is shown in FIGS. 22 to 24, for convenience), and the first to fourth pinion gears P1c to P4c are rotatably supported by the carrier member 302. The carrier member 302 basically has the same construction as that of the carrier member 105 of the fifth embodiment, and hence detailed description thereof is omitted. Furthermore, the first and second sun gears S1c and S2c, the carrier member 302, and the first and second ring gears R1c and R2c are arranged on the same axis.

The double pinion gear 301 extends relatively largely in the axial direction, and the third pinion gears P3c extend in the axial direction over a shorter length than that of the double pinion gear 301 but over a longer length than those of the first sun gear S1c, the first pinion gears P1c, and the first ring gear R1c. Further, the third pinion gears P3c are arranged such that they do not overlap either of the second sun gear S2c and the second pinion gears P2c in the radial direction. The first sun gear Sic is disposed such that it does not overlap either of the first pinion gears P1c and the first ring gear R1c in the radial direction. Further, the first sun gear Sic is in mesh with right-side portions of the third pinion gears P3c, and the first pinion gears P1c are in mesh with left-side portions of the third pinion gears P3c.

Furthermore, the second ring gear R2c is disposed such that it overlaps the first sun gear Slc in the radial direction, but it does not overlap either of the second sun gear S2c and the second pinion gears P2c in the radial direction. The fourth pinion gears P4c extend in the axial direction over a shorter length than that of the double pinion gear 301 but over a longer length than those of the second sun gear S2c, the second pinion gears P2c, and the second ring gear R2c. Further, the fourth pinion gears P4c are arranged such that they do not overlap either of the first pinion gears P1c and the first ring gear R1c in the radial direction. The second pinion gears P2c are in mesh with right-side portions of the fourth pinion gears P4c, and the second ring gear R2c is in mesh with left-side portions of the fourth pinion gears P4c.

As described above, the first sun gear Sic and the first pinion gears P1c are arranged such that they do not overlap each other in the radial direction (see FIGS. 22 and 23), so that even when the first and second sun gears S1c and S2c, and the first and second pinion gears P1c and P2c integrally formed with each other have the same diameters, respectively, and also the second sun gear S2c and the second pinion gears P2c are in mesh with each other, the first sun gear S1c and the first pinion gears P1c are not in mesh with each other.

Further, the third pinion gears P3c, the second sun gear S2c, and the second pinion gears P2c are arranged such that they do not overlap each other in the radial direction (see FIGS. 22 to 24). Therefore, even when the first and second sun gears Sic and S2c, and the first and second pinion gears P1c and P2c integrally formed with each other have the same diameters, respectively, and also the third pinion gear P3c are in mesh with both the first sun gear S1c and the first pinion gears P1c, the third pinion gears P3c, the second sun gear S2c, and the second pinion gears P2c are not in mesh with each other.

Furthermore, the second ring gear R2c and the second pinion gears P2c are arranged such that they do not overlap each other in the radial direction (see FIGS. 23 and 24). Therefore, even when the first and second ring gears R1c and R2c, and the first and second pinion gears P1c and P2c integrally formed with each other have the same diameters, respectively, and also the first pinion gears P1c and the first ring gear. R1c are in mesh with each other, the second ring gear R2c and the second pinion gears P2c are not in mesh with each other.

Further, the fourth pinion gears P4c, the first pinion gears P1c, and the first ring gear R1c are arranged such that they do not overlap, each other in the radial direction (see FIGS. 22 to 24). Therefore, even when the first and second pinion gears P1c and P2c integrally formed with each other, and the first and second ring gears R1c and R2c have the same diameters, respectively, and also the fourth pinion gears P4c are in mesh with both the second pinion gears P2c and the second ring gear R2c, the fourth pinion gears P4c, the first pinion gears P1c, and the first ring gear R1c are not in mesh with each other.

As described above, according to the above variation, similarly to the fifth embodiment, the diameters and the tooth numbers of the first and second pinion gears P1c and P2c are set to the same values, respectively, so that they are excellent in productivity. Similarly, since the respective diameters and tooth numbers of the first and second sun gears S1c and S2c, and the respective diameters and tooth numbers of the first and second ring gears R1c and R2c are set to the same values, respectively, they are excellent in productivity.

Figure 17:
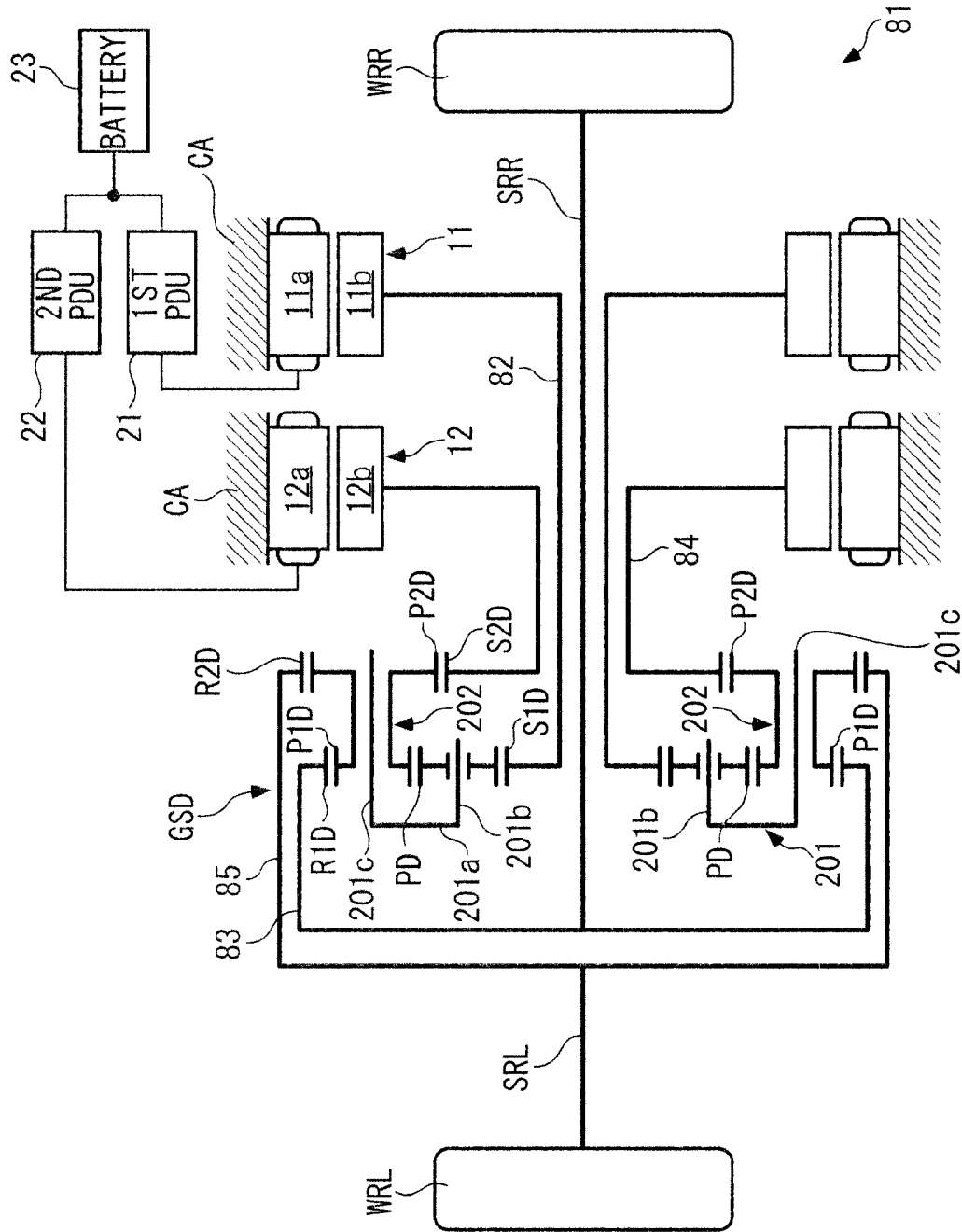
[FIG. 17] A diagram schematically showing a power plant according to a sixth embodiment of the present invention together with left and right rear wheels of a vehicle to which the power plant is applied.
Figure 18:
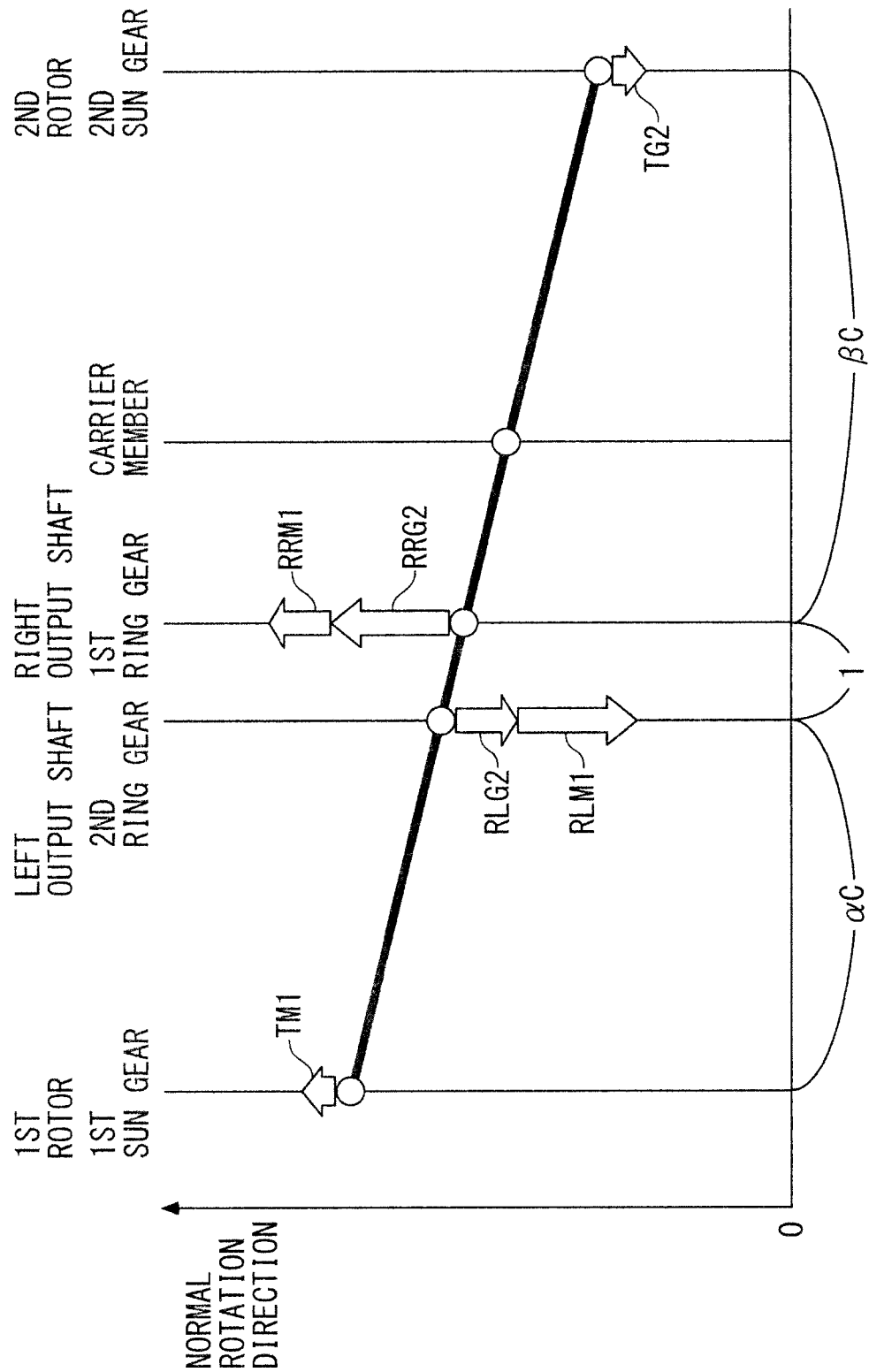
[FIG. 18] A collinear chart showing a rotational speed relationship and a torque balance relationship between various types of rotary elements of the power plant shown in FIG. 17, as to third yaw moment-increasing control for right turning.
Figure 19:
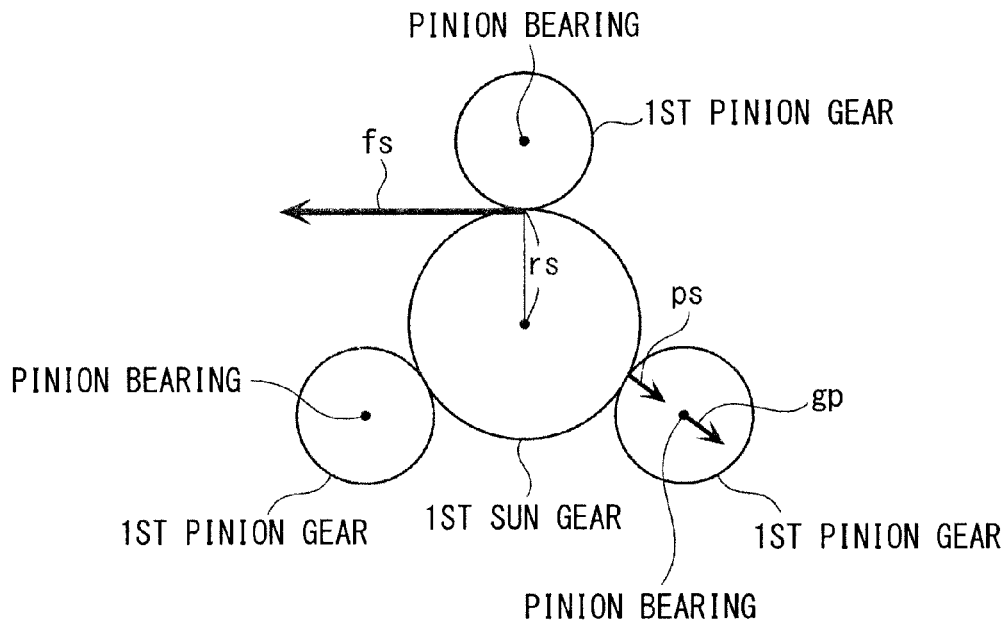
[FIG. 19] A diagram useful in explaining problems of a conventional technique.

Next, a power plant 81 according to a sixth embodiment of the present invention will be described with reference to FIGS. 17 and 18. This power plant 81 is distinguished from the first embodiment mainly in the construction of a gear unit GSD. In FIGS. 17 and 18, the same component elements as those of the first embodiment are denoted by the same reference numerals. The following description is mainly given of different points from the first embodiment.

The gear unit GSD basically has the same construction as that the gear unit GSB according to the fourth embodiment, and includes a carrier member 201, a first sun gear S1D, pinion gears PD, a double pinion gear 202, a first ring gear R1D, a second sun gear S2D, and a second ring gear R2D. The gear unit GSD is disposed coaxially with the left and right output shafts SRL and SRR, and is located between the left and right rear wheels WRL and WRR.

The carrier member 201 is comprised of a root portion 201a having an annular plate shape, four first support shafts 201b (only two of which are shown) and four second support shafts 201c (only two of which are shown) which are integrally formed with the root portion 201a. Further, the carrier member 201 is rotatably supported by a bearing (not shown), and first and third rotating shafts 82 and 84, referred to hereinafter, are relatively rotatably disposed inward of the carrier member 201.

The first support shafts 201b are arranged at a radially inner end of the first root portion 201a, and the second support shafts 201c are arranged at a radially outer end of the first root portion 201a. The two 201b and 201c extend toward the right rear wheels WRR in the axial direction of the left and right output shafts SRL and SRR. Further, the four first support shafts 201b are located at equally-spaced intervals in a circumferential direction of the root portion 201a. The same applied to the four second support shafts 201c.

The above-mentioned double pinion gears 202 are each comprised of a first pinion gear P1D, and a second pinion gear P2D integrally formed with each other. The number of the double pinion gears 202 is 4 (only two of which are shown) which is equal to the number of the above-mentioned second support shafts 201c, and each double pinion gear 202 is rotatably supported on an associated one of the second support shafts 201c via a bearing (not shown). Further, the first and second pinion gears P1D and P2D have pitch circle diameters different from each other. Note that the number of the double pinion gears 202 and the number of the second support shafts 201c are not limited to 4 but they can be set as desired.

Further, the first sun gear S1D, the pinion gears PD, the first pinion gears P1D of the double pinion gears 202, and the first ring gear R1D are radially arranged from inside in this order. The first sun gear S1D is connected to the first rotor 11b via a first rotating shaft 82 which is hollow cylindrical and rotatably supported by a bearing (not shown), and is rotatable in unison with the first rotor 11b. The right output shaft SRR and a third rotating shaft 84 are relatively rotatably arranged inside and outside the first rotating shaft 82, respectively.

The number of the pinion gears PD is 4 (only two of which are shown) which is equal to the number of the above-described first support shafts 201b of the carrier member 201. Each pinion gear PD is rotatably supported on an associated one of the first support shafts 201b via a bearing (not shown), and is in mesh with both the first sun gear S1D and an associated one of the first pinion gears P1D. Note that the number of the pinion gears PD and the number of the first support shafts 201b are not limited to 4 but they can be set as desired. The first ring gear R1D is connected to the right output shaft SRR via a second rotating shaft 83 which is hollow cylindrical and rotatably supported by a bearing (not shown) and a flange, and is rotatable in unison with the right output shaft SRR. The carrier member 201 and a fourth rotating shaft 85, referred to hereinafter, are relatively rotatably arranged inside and outside the second rotating shaft 83, respectively.

The above-mentioned second sun gear S2D, second pinion gears P2D of the double pinion gears 202, and second ring gear R2D are radially arranged from inside in this order. A gear set of these gears is arranged between a gear set of the above-described first sun gear S1D, pinion gears PD, first pinion gears P1D, and first ring gear R1D, and the second rotating electric machine 12. The second sun gear S2D is connected to the second rotor 12b via the third rotating shaft 84 which is hollow cylindrical and rotatably supported by a bearing (not shown), and is rotatable in unison with the second rotor 12b.

The second pinion gears P2D of the double pinion gears 202 are in mesh with both the second sun gear S2D and the second ring gear R2D. The second ring gear R2D is connected to the left output shaft SRl via the fourth rotating shaft 85 which is hollow cylindrical and rotatably supported by a bearing (not shown) and a flange, and is rotatable in unison with the left output shaft SRL. Further, a pitch circle diameter of the second ring gear R2D is set to a larger value than that of the first ring gear R1D, and a pitch circle diameter of the second pinion gear P2D is set to a larger value than that of the first pinion gear P1D.

With the above arrangement, the first sun gear S1D, the second ring gear R2D, the first ring gear R1D, the carrier member 201, and the second sun gear S2D are capable of transmitting motive power therebetween, and the rotational speeds thereof are in a collinear relationship with each other. Further, when the first sun gear S1D is caused to rotate in a state in which the carrier member 201 is fixed, both the first and second ring gears R1D and R2D rotate in the same direction as the direction of rotation of the first sun gear S1D, and the second sun gear S2D rotates in a direction opposite to the direction of rotation of the first sun gear S1D.

In this case, from the relationship between the tooth numbers of the gears, the relationship of "the rotational speed of the first sun gear S1D>the rotational speed of the second ring gear R2D>the rotational speed of the first ring gear R1D" holds between the rotational speeds of the first sun gear S1D, the second ring gear R2D, and the first ring gear R1D. From the above, in the collinear chart indicating the relationship between the rotational speeds, the first sun gear S1D, the second ring gear R2D, the first ring gear R1D, the carrier member 201, and the second sun gear S2D are depicted in this order.

Further, since the first sun gear S1D and the first rotor 11b are connected to each other via the first rotating shaft 82, the rotational speeds of the first sun gear S1D and the first rotor 11b are equal to each other. Furthermore, since the first ring gear R1D is connected to the right output shaft SRR via the second rotating shaft 83 and the flange, the rotational speeds of the first ring gear RID and the right output shaft SRR are equal to each other. Further, since the second ring gear R2D is connected to the left output shaft SRL via the fourth rotating shaft 85 and the flange, the rotational speeds of the second ring gear R2D and the left output shaft SRL are equal to each other. Further, since the second sun gear S2D and the second rotor 12b are connected to each other via the third rotating shaft 84, the rotational speeds of the second sun gear S2D and the second rotor 12b are equal to each other.

From the above, a rotational speed relationship and a torque balance relationship between the various types of rotary elements of the power plant 81 according to the sixth embodiment are represented e.g. in a collinear chart shown in FIG. 18. Various parameters appearing in the figure are as described in the first and second embodiments except for αC and βC. Further, as is apparent from FIG. 18, the left and right output shafts SRL and SRR can be differentially rotated with each other. Furthermore, as is apparent from a comparison between this FIG. 18 and FIG. 5 which shows the rotational speed relationship and the torque balance relationship between the various types of the rotary elements of the power plant according to the first embodiment, the power plant 81 according to the sixth embodiment operates similarly to the power plant 1 according to the first embodiment.

In FIG. 18, αC and βC represent a first lever ratio and a second lever ratio, respectively, and are expressed by the following equations (8) and (9):

$$\alpha C = \{ZR1D(ZR2D \times ZP1D - ZS1D \times ZP2D)\}/\{ZS1D (ZR1D \times ZP2D - ZR2D \times ZP1D)\} \quad (8)$$

$$\beta C = \{ZR2D(ZR1D \times ZP2D + ZS2D \times ZP1D)\}/\{ZS2D (ZR1D \times ZP2D - ZR2D \times ZP1D)\} \quad (9)$$

Wherein ZR1D represents the tooth number of the first ring gear R1D, ZS2D represents the tooth number of the second ring gear S2D, ZP1D represents the tooth number of the first pinion gear P1D, ZS1D represents the tooth number of the first sun gear S1D, ZP2D represents the tooth number of the second pinion gear P2D, and ZS2D represents the tooth number of the second sun gear S2D. Note that the order of appearance of the first and second ring gears RID and R2D in the collinear chart shown in FIG. 18 is changed depending on the settings of the tooth numbers thereof.

Further, the correspondence between various elements of the sixth embodiment and the various elements of the present invention is the same as in the fifth embodiment.

As described above, according to the sixth embodiment, the double pinion gears 202 and the pinion gears PD are rotatably supported by the carrier member 201. The first pinion gears P1D of the double pinion gears 202 are in mesh with the pinion gears PD, the pinion gears PD are in mesh with the first sun gear S1D, and the second pinion gears P2D are in mesh with the second sun gear S2D. Further, the first and second pinion gears P1D and P2D are in mesh with the first and second ring gears R1D and R2D, respectively.

Further, the first and second sun gears S1D and S2D are connected to the first and second rotating electric machines 11 and 12, respectively, and the first and second ring gears R1D and R2D are connected to the right output shaft SRR and the left output shaft SRL, respectively. With the above, it is possible to transmit rotational energy output from the first and second rotating electric machines 11 and 12, to the left and right output shafts SRL and SRR via the first sun gear S1D, the second sun gear S2D, the second ring gear R2D, the first ring gear R1D, and so forth, and properly drive (brake) the output shafts SRL and SRR.

In this case, the rotational speeds of the first sun gear S1D, the second ring gear R2D, the first ring gear R1D, the carrier member 201, and the second sun gear S2D are in the collinear relationship with each other, as described above, and hence by controlling input and output of rotational energy to and from the first and second rotating electric machines 11 and 12, it is possible to properly control rotational energy (torque) distributed to the left and right output shafts SRL and SRR, and in turn enhance traveling performance including the turnability of the vehicle.

Further, differently from the above-described conventional power plant, not the sun gears but the second and first ring gears R2D and R1D are connected to the left and right output shafts SRL and SRR, respectively, so that similarly to the first embodiment, it is possible to set the tooth widths of the first and second ring gears RID and R2D to relatively small values, whereby it is possible to downsize the power plant 81.

Further, as described hereinabove, as is apparent from the fact that in the collinear chart, the first and second sun gears S1D and S2D are located outside the second and first ring gears R2D and R1D, respectively, respective torques transmitted from the first and second rotating electric machines 11 and 12 to the first and second sun gears S1D and S2D are transmitted to the left and right output shafts SRL and SRR in increased states. This makes it possible to set the tooth widths of the first and second sun gears S1D and S2D to relatively small values, which also makes it possible to downsize the power plant 81.

Furthermore, the first and second pinion gears P1D and P2D are in mesh with the first and second ring gears R1D and R2C, and hence similarly to the first embodiment, it is possible to downsize the bearings supporting the first and second pinion gears P1D and P2D, which also makes it possible to downsize the power plant 81.

Note that in the first, third, and sixth embodiments, the vehicle is constructed such that the left and right front wheels are driven by the engine, and the left and right rear wheels WRL and WRR (left and right output shafts SRL and SRR) are driven by the power plant 1, 51, or 81, but inversely, the vehicle may be constructed such that the left and right output shafts connected to the respective left and right front wheels are driven by the power plant according to the present invention, and the left and right rear wheels WRL and WRR are driven by the engine. Further, although the first, third, and sixth embodiments are examples in which the power plants 1, 51, and 81 according to the present invention are applied to the vehicle having the engine installed thereon, the present invention is not limited to this, but it can be applied to a vehicle with no engine installed thereon.

Further, although in the fourth and fifth embodiments, the power plants 61 and 71 are configured to drive the left and right output shafts SRL and SRR connected to the left and right rear wheels WRL and WRR, they may be configured to drive the left and right output shafts SFL and SFR connected to the left and right front wheels WFL and WFR, similarly to the second embodiment, or they may be configured similarly to the first and second variations according to the second embodiment. Furthermore, although in the fourth embodiment, the second ring gear R2A, and in the fifth embodiment, the carrier member 105 are connected to the engine corresponding to the energy output device of the present invention, they are not necessarily required to be connected to the engine.

Note that the present invention is by no means limited to the above-described first to sixth embodiments (including the variations: hereinafter, collectively referred to as "the embodiments"), but can be practiced in various forms. For example, although in the above-described first, second, fifth, and sixth embodiments, the first ring gears, R1, R1C, and R1D are connected to the right output shaft SRR (SFR), and the second ring gears R2, R2C, and R2D are connected to the left output shaft SRL (SFL), this is not limitative, but inversely, the first ring gears, R1, R1C, and RID may be connected to the left output shaft SRL (SFL), and the second ring gears R2, R2C, and R2D may be connected to the right output shaft SRR (SFR), In this case, the sun gear SD of the differential gear D described in the second embodiment is connected to a rotational energy transmission path between the first ring gear R1 and the left output shaft SRL (SFL), and the carrier CD is provided in a rotational energy transmission path between the second ring gear R2 and the right output shaft SRR (SFR).

Further, although in the third and fourth embodiments, the first ring gear R1A is connected to the left output shaft SRL, and the carrier member 101 is connected to the right output shaft SRR, this is not limitative, but inversely, the first ring gear R1A may be connected to the right output shaft SRR, and the carrier member 101 may be connected to the left output shaft SRL. Furthermore, although in the embodiments, the first and second pinion gears P1, P1A, P1C, P1D, P2, P2A, P2C, and P2D are integrally formed with each other, they may be formed separately and then be integrally connected to each other.

Further, although in the embodiment, the first and second energy input/output devices of the present invention are the first and second rotating electric machines 11 and 12, they may be replaced by any other suitable device, such as a hydraulic motor, which can input and output rotational energy. Furthermore, although in the embodiment, AC motors are used as the first and second rotating electric machines 11 and 12, any other suitable device, such as a DC motor, may be used which can perform energy conversion between rotational energy and electric energy.

Further, although in the embodiment, the battery 23 is shared by the first and second rotating electric machines 11 and 12, batteries may be provided separately. Furthermore, although in the embodiment, electric power regenerated by the first and second rotating electric machines 11 and 12 is charged into the battery 23, the electric power may be charged into a capacitor. Alternatively, any other rotating electric machine than the first and second rotating electric machines 11 and 12, and a flywheel connected to the other rotating electric machine may be used to convert the electric power regenerated by the first and second rotating electric machines 11 and 12 to motive power using the other rotating electric machine, and accumulate the motive power obtained by the conversion in the flywheel as kinetic energy. Alternatively, the electric power regenerated by the first and second rotating electric machines 11 and 12 may be directly supplied to another rotating electric machine or an actuator. Alternatively, a hydraulic motor capable of converting rotational energy to pressure energy as described above may be used in place of the first and second rotating electric machines 11 and 12, and the pressure energy obtained by the conversion by the hydraulic motor may be accumulated in the accumulator.

Further, although in the second embodiment, the differential gear D, which is a planetary gear unit of a double pinion type, is used, a suitable differential gear of any other type may be used which has the first to third rotary elements which are differentially rotatable with respect to each other. For example, there may be used a planetary gear unit of a single pinion type or a differential gear of the following type: A type which has a pair of side gears, a plurality of pinion gears in mesh with the side gears, and a carrier rotatably supporting the pinion gears, and distributes torque transmitted to the carrier to the pair of side gears at a distribution ratio of 1:1. Further, although in the embodiment, the power plants 1, 41, 51, 61, 71, and 81 according to the present invention are configured to drive the left and right output shafts SRL and SRR (SFL and SFR), they may be configured to drive front and rear output shafts connected to front and rear drive wheels of the vehicle.

Further, although in the second, fourth and fifth embodiments, the engine (3), which is a gasoline engine, is used as an energy output device of the present invention, any other suitable device which can output rotational energy, such as a diesel engine, an LPG engine, a CNG (Compressed Natural Gas) engine, an external combustion engine, a rotating electric machine, or a hydraulic motor, may be used. Furthermore, although in the embodiment, the left and right output shafts SRL and SRR (SFL and SFR) are directly connected to the left and right rear wheels WRL and WRR (left and right front wheels WFL and WFR), respectively, they may be connected via gears and the like. Further, although the embodiment is an example in which the present invention is applied to a vehicle, the present invention is not limited to this, but it may be applied e.g. to boats or aircrafts. It is to be further understood that various changes and modifications may be made without departing from the spirit and scope thereof.

INDUSTRIAL APPLICABILITY

The present invention is very useful for achieving downsizing of the power plant.

REFERENCE SIGNS LIST 1 power plant
3 engine (energy output device)
SRR right output shaft (one of two rotating shafts)
SRL left output shaft (the other of two rotating shafts)
VFR vehicle (means of transport)
VAW vehicle (means of transport)
WRL left rear wheels (two driven parts)
WRR right rear wheels (two driven parts)
WFL left front wheels (two driven parts)
WFR right front wheels (two driven parts)
13 carrier member
14 double pinion gear
P1 first pinion gear
P2 second pinion gear
P pinion gear
S sun gear
R1 first ring gear
R2 second ring gear
11 first rotating electric machine (first energy input/output device)
12 second rotating electric machine (second energy input/output device)
17 flange (rotational energy transmission path between first ring gear and one of two rotating shafts)
41 power plant
SFR right output shaft (one of two rotating shafts)
SEL left output shaft (the other of two rotating shafts)

D differential gear
SD sun gear (first rotary element)
CD carrier (second rotary element)
RD ring gear (third rotary element)
51 power plant
61 power plant
P1A first pinion gear
P2A second pinion gear
102 double pinion gear
PA pinion gear
101 carrier member
S1A first sun gear
S2A second sun gear
R1A first ring gear
R2A second ring gear
71 power plant
P1C first pinion gear
P2C second pinion gear
106 double pinion gear
P3C third pinion gear
P4C fourth pinion gear
105 carrier member
S1C first sun gear
R1C first ring gear
S2C second sun gear
R2C second ring gear
P1c first pinion gear
P2c second pinion gear
301 double pinion gear
P3c third pinion gear
P4c fourth pinion gear
302 carrier member
S1c first sun gear
P1c first ring gear
S2c second sun gear
R2c second ring gear
81 power plant
P1D first pinion gear
P2D second pinion gear
202 double pinion gear
PD pinion gear
201 carrier member
S1D first sun gear
R1D first ring gear
S2D second sun gear
R2D second ring gear

The invention claimed is:

1. A power plant for driving two rotating shafts which are differentially rotatable with each other, comprising:
   a double pinion gear that is formed by a first pinion gear and a second pinion gear which are integrally formed with each other;
   a pinion gear that is in mesh with said first pinion gear;
   a carrier member that is rotatable, said carrier member rotatably supporting said double pinion gear and said pinion gear;
   a sun gear that is rotatable and is in mesh with said pinion gear;
   a first ring gear that is rotatable and is in mesh with said first pinion gear, said first ring gear being connected to one of the two rotating shafts;
   a second ring gear that is rotatable and is in mesh with said second pinion gear, said second ring gear being connected to the other of the two rotating shafts;
   a first energy input/output device that is connected to said carrier member and is capable of inputting and outputting rotational energy; and
   a second energy input/output device that is connected to said sun gear and is capable of inputting and outputting rotational energy.

2. The power plant according to claim 1, further comprising:
   a differential gear that includes a first rotary element, a second rotary element, and a third rotary element, which are differentially rotatable with each other; and
   an energy output device that is configured to be capable of outputting rotational energy, and is provided separately from said first and second energy input/output devices, and
   wherein said first rotary element is connected to a rotational energy transmission path between said first ring gear and the one of the two rotating shafts, said second rotary element is provided in a rotational energy transmission path between said second ring gear and the other of the two rotating shafts, and said third rotary element is connected to said energy output device.

3. A power plant for driving two rotating shafts which are differentially rotatable with each other, comprising:
   a double pinion gear that is formed by a first pinion gear and a second pinion gear which are integrally formed with each other;
   a pinion gear that is in mesh with said first pinion gear;
   a carrier member that is rotatable, said carrier member rotatably supporting said double pinion gear and said pinion gear and being connected to one of the two rotating shafts;
   a first sun gear that is rotatable and is in mesh with said pinion gear;
   a second sun gear that is rotatable and is in mesh with said second pinion gear;
   a first ring gear that is rotatable and is in mesh with one of said first and second pinion gears, said first ring gear being connected to the other of the two rotating shafts;
   a first energy input/output device that is connected to said first sun gear and is capable of inputting and outputting rotational energy; and
   a second energy input/output device that is connected to said second sun gear and is capable of inputting and outputting rotational energy,
   the power plant further comprising a second ring gear that is rotatable and is in mesh with the other of said first and second pinion gears.

4. The power plant according to claim 3, further comprising an energy output device that is configured to be capable of outputting rotational energy, and is provided separately from said first and second energy input/output devices, and
   wherein said second ring gear is mechanically connected to said energy output device.

5. A power plant for driving two rotating shafts which are differentially rotatable with each other, comprising:
   a double pinion gear that is formed by a first pinion gear and a second pinion gear which are integrally formed with each other;
   a third pinion gear that is in mesh with said first pinion gear;
   a fourth pinion gear that is in mesh with said second pinion gear;
   a carrier member that is rotatable, said carrier member rotatably supporting said double pinion gear and said third and fourth pinion gears;
   a first sun gear that is rotatable and is in mesh with said third pinion gear;
   a first ring gear that is rotatable and is in mesh with said first pinion gear, said first ring bear being connected to one of the two rotating shafts;

a second sun gear that is rotatable and is in mesh with said second pinion gear;

a second ring gear that is rotatable and is in mesh with said fourth pinion gear, said second ring gear being connected to the other of the two rotating shafts;

a first energy input/output device that is connected to said first sun gear and is capable of inputting and outputting rotational energy; and a second energy input/output device that is connected to said second sun gear and is capable of inputting and outputting rotational energy.

6. The power plant according to claim 5, wherein said first pinion gear and said second pinion gear have the same diameter and the same number of gear teeth.

7. The power plant according to claim 6, wherein said first ring gear and said second ring gear have the same number of gear teeth.

8. The power plant according to claim 7, wherein said first sun gear and said second sun gear have the same number of gear teeth.

9. The power plant according to claim 6, further comprising an energy output device that is configured to be capable of outputting rotational energy, and is provided separately from said first and second energy input/output devices, and wherein said carrier member is mechanically connected to said energy output device.

10. A power plant for driving two rotating shafts which are differentially rotatable with each other, comprising:

a double pinion gear that is formed by a first pinion gear and a second pinion gear which are integrally formed with each other;

a pinion gear that is in mesh with said first pinion gear;

a carrier member that is rotatable, said carrier member rotatably supporting said double pinion gear and said pinion gear;

a first sun gear that is rotatable and is in mesh with said pinion gear;

a first ring gear that is rotatable and is in mesh with said first pinion gear, said first ring gear being connected to one of the two rotating shafts;

a second sun gear that is rotatable and is in mesh with said second pinion gear;

a second ring gear that is rotatable and is in mesh with said second pinion gear, said second ring gear being connected to the other of the two rotating shafts;

a first energy input/output device that is connected to said first sun gear and is capable of inputting and outputting rotational energy; and a second energy input/output device that is connected to said second sun gear and is capable of inputting and outputting rotational energy.

11. The power plant according to claim 1, wherein said first and second energy input/output devices are rotating electric machines.

12. The power plant according to claim 1, wherein the two rotating shafts are connected to two driven parts for propelling a means of transport.

13. The power plant according to claim 12, wherein one of the two driven parts is disposed on one side in a left-right direction with respect to a traveling direction of the means of transport, and the other of the two driven parts is disposed on the other side in the left-right direction.

14. The power plant according to claim 12, wherein the means of transport is a vehicle, and the driven parts are wheels of the vehicle.

* * * * *